United States Patent
He et al.

(10) Patent No.: US 11,978,904 B2
(45) Date of Patent: May 7, 2024

(54) POLYMER BINDER FOR LITHIUM BATTERY AND METHOD OF MANUFACTURING

(71) Applicant: Global Graphene Group, Inc., Dayton, OH (US)

(72) Inventors: Hui He, Dayton, OH (US); Aruna Zhamu, Springboro, OH (US); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 275 days.

(21) Appl. No.: 17/064,975

(22) Filed: Oct. 7, 2020

(65) Prior Publication Data

US 2021/0098790 A1    Apr. 1, 2021

Related U.S. Application Data

(63) Continuation-in-part of application No. 15/442,278, filed on Feb. 24, 2017, now Pat. No. 10,840,502.

(51) Int. Cl.
*H01M 4/62*    (2006.01)
*H01M 4/36*    (2006.01)
(Continued)

(52) U.S. Cl.
CPC ........... *H01M 4/622* (2013.01); *H01M 4/364* (2013.01); *H01M 4/366* (2013.01); *H01M 4/625* (2013.01);
(Continued)

(58) Field of Classification Search
CPC ...... H01M 4/622; H01M 4/364; H01M 4/366; H01M 4/625; H01M 10/052;
(Continued)

(56) References Cited

U.S. PATENT DOCUMENTS

| 2,798,878 | A | 7/1957 | Hummers |
| 3,836,511 | A | 9/1974 | O'farrell et al. |

(Continued)

FOREIGN PATENT DOCUMENTS

| CN | 101383408 A | 3/2009 |
| CN | 103258990 A | 8/2013 |

(Continued)

OTHER PUBLICATIONS

"Nylon" en.wikipedia.org/wiki/Nylon. Accessed Feb. 18, 2020 (Year: 2020).

(Continued)

*Primary Examiner* — Gary D Harris

(57) ABSTRACT

Provided is an anode active material layer for a lithium battery. The anode active material layer comprises multiple anode active material particles and an optional conductive additive that are bonded together by a binder comprising a high-elasticity polymer having a recoverable or elastic tensile strain no less than 5% when measured without an additive or reinforcement in the polymer. The high-elasticity polymer contains a cross-linked network of polymer chains. The anode active material preferably has a specific lithium storage capacity greater than 372 mAh/g (e.g. Si, Ge, Sn, $SnO_2$, $Co_3O_4$, etc.).

13 Claims, 10 Drawing Sheets

(51) Int. Cl.
  *H01M 10/052* (2010.01)
  *H01M 10/0562* (2010.01)
  *H01M 4/02* (2006.01)

(52) U.S. Cl.
  CPC ..... *H01M 10/052* (2013.01); *H01M 10/0562* (2013.01); *H01M 2004/021* (2013.01); *H01M 2004/027* (2013.01); *H01M 2300/0068* (2013.01)

(58) Field of Classification Search
  CPC ....... H01M 10/0562; H01M 2004/021; H01M 2004/027; H01M 2300/0068; H01M 12/08; H01M 2300/0082; H01M 2300/0091; H01M 4/38; H01M 4/386; H01M 4/387; H01M 4/405; H01M 4/485; H01M 4/62; H01M 10/0525; Y02E 60/10
  USPC ........................................................ 429/405
  See application file for complete search history.

(56) References Cited

U.S. PATENT DOCUMENTS

| | | |
|---|---|---|
| 4,720,910 A | 1/1988 | Rourke et al. |
| 5,057,339 A | 10/1991 | Ogawa |
| 5,162,170 A | 11/1992 | Miyabayashi et al. |
| 5,270,417 A | 12/1993 | Soga et al. |
| 5,342,710 A | 8/1994 | Koksbang |
| 5,350,647 A | 9/1994 | Hope et al. |
| 5,409,785 A | 4/1995 | Nakano et al. |
| 5,424,151 A | 6/1995 | Koksbang et al. |
| 5,434,021 A | 7/1995 | Fauteux et al. |
| 5,460,905 A | 10/1995 | Skotheim |
| 5,536,599 A | 7/1996 | Alamgir et al. |
| 5,648,187 A | 7/1997 | Skotheim |
| 5,961,672 A | 10/1999 | Skotheim et al. |
| 6,025,094 A | 2/2000 | Visco et al. |
| 6,218,055 B1 | 4/2001 | Shah et al. |
| 6,447,952 B1 | 9/2002 | Spiegel et al. |
| 6,451,484 B1 | 9/2002 | Han et al. |
| 6,475,678 B1 | 11/2002 | Suzuki |
| 6,515,101 B1 | 2/2003 | Sheares |
| 6,620,547 B1 | 9/2003 | Sung et al. |
| 6,733,924 B1 | 5/2004 | Skotheim et al. |
| 6,797,428 B1 | 9/2004 | Skotheim et al. |
| 6,936,381 B2 | 8/2005 | Skotheim et al. |
| 7,247,408 B2 | 7/2007 | Skotheim et al. |
| 7,282,295 B2 | 10/2007 | Visco et al. |
| 7,282,296 B2 | 10/2007 | Visco et al. |
| 7,282,302 B2 | 10/2007 | Visco et al. |
| 7,618,678 B2 | 11/2009 | Mao et al. |
| 8,597,828 B2 | 12/2013 | Martinet et al. |
| 9,905,856 B1 | 2/2018 | Zhamu et al. |
| 10,084,182 B2 | 9/2018 | Pan et al. |
| 10,483,533 B2 | 11/2019 | Zhamu et al. |
| 10,629,899 B1 | 4/2020 | Jang |
| 2002/0034685 A1 | 3/2002 | Sato et al. |
| 2002/0182488 A1 | 12/2002 | Cho et al. |
| 2002/0195591 A1 | 12/2002 | Ravet et al. |
| 2003/0180619 A1 | 9/2003 | Tamura et al. |
| 2004/0018430 A1 | 1/2004 | Holman et al. |
| 2005/0034993 A1 | 2/2005 | Gozdz et al. |
| 2005/0042515 A1 | 2/2005 | Hwang et al. |
| 2005/0095504 A1 | 5/2005 | Kim et al. |
| 2005/0098914 A1 | 5/2005 | Varma et al. |
| 2005/0118508 A1 | 6/2005 | Yong et al. |
| 2005/0136330 A1 | 6/2005 | Mao et al. |
| 2006/0263697 A1 | 11/2006 | Dahn et al. |
| 2007/0059600 A1 | 3/2007 | Kim et al. |
| 2007/0218369 A1 | 9/2007 | Kaiduka et al. |
| 2007/0289879 A1 | 12/2007 | Horton |
| 2008/0248393 A1 | 10/2008 | Richard et al. |
| 2008/0318128 A1 | 12/2008 | Simoneau et al. |
| 2009/0155676 A1 | 6/2009 | Zhamu et al. |
| 2009/0169725 A1 | 7/2009 | Zhamu et al. |
| 2009/0186093 A1 | 7/2009 | Liu et al. |
| 2010/0099029 A1 | 4/2010 | Kinoshita et al. |
| 2010/0112454 A1 | 5/2010 | Visco et al. |
| 2010/0143798 A1 | 6/2010 | Zhamu et al. |
| 2010/0173198 A1 | 7/2010 | Zhamu et al. |
| 2011/0027658 A1 | 2/2011 | Kim et al. |
| 2011/0059361 A1 | 3/2011 | Wilkening et al. |
| 2011/0104571 A1 | 5/2011 | Zhamu et al. |
| 2011/0143211 A1 | 6/2011 | Takeyama |
| 2011/0177388 A1 | 7/2011 | Bae et al. |
| 2011/0244337 A1 | 10/2011 | Ohta et al. |
| 2011/0262816 A1 | 10/2011 | Amatucci |
| 2012/0058397 A1 | 3/2012 | Zhamu et al. |
| 2012/0064409 A1 | 3/2012 | Zhamu et al. |
| 2012/0070708 A1 | 3/2012 | Ohira et al. |
| 2012/0070746 A1 | 3/2012 | Mikhaylik et al. |
| 2012/0088154 A1 | 4/2012 | Liu et al. |
| 2013/0052544 A1 | 2/2013 | Ohkubo et al. |
| 2013/0054061 A1 | 2/2013 | Nishimoto |
| 2013/0122373 A1 | 5/2013 | Tamura et al. |
| 2013/0157141 A1 | 6/2013 | Zhong et al. |
| 2013/0164615 A1 | 6/2013 | Manthiram et al. |
| 2013/0171339 A1 | 7/2013 | Wang et al. |
| 2013/0224603 A1 | 8/2013 | Chen et al. |
| 2013/0292613 A1 | 11/2013 | Wegner et al. |
| 2014/0072879 A1 | 3/2014 | Chen et al. |
| 2014/0097380 A1 | 4/2014 | Wu et al. |
| 2014/0147738 A1 | 5/2014 | Chen et al. |
| 2014/0147751 A1 | 5/2014 | Yang et al. |
| 2014/0154572 A1 | 6/2014 | Singh et al. |
| 2014/0162121 A1 | 6/2014 | Ryu et al. |
| 2014/0178747 A1 | 6/2014 | Tsai et al. |
| 2014/0234702 A1 | 8/2014 | Zhang et al. |
| 2014/0235513 A1 | 8/2014 | Kverel et al. |
| 2014/0255785 A1 | 9/2014 | Do et al. |
| 2014/0363746 A1 | 12/2014 | He et al. |
| 2015/0044556 A1 | 2/2015 | Wang et al. |
| 2015/0064568 A1 | 3/2015 | Yushin et al. |
| 2015/0064574 A1 | 3/2015 | He et al. |
| 2015/0079485 A1 | 3/2015 | Choi et al. |
| 2015/0162641 A1 | 6/2015 | Visco et al. |
| 2015/0180000 A1 | 6/2015 | Roumi |
| 2015/0180037 A1 | 6/2015 | Gronwald et al. |
| 2015/0218323 A1 | 8/2015 | Kim et al. |
| 2015/0221935 A1 | 8/2015 | Zhou et al. |
| 2015/0236372 A1 | 8/2015 | Yushin et al. |
| 2015/0244025 A1 | 8/2015 | Rhee et al. |
| 2015/0318532 A1 | 11/2015 | Manthiram et al. |
| 2015/0318555 A1 | 11/2015 | Oku et al. |
| 2015/0325844 A1 | 11/2015 | Inoue |
| 2015/0372294 A1 | 12/2015 | Minami et al. |
| 2016/0013481 A1 | 1/2016 | Jeong et al. |
| 2016/0043384 A1 | 2/2016 | Zhamu et al. |
| 2016/0087266 A1 | 3/2016 | Muldoon et al. |
| 2016/0126543 A1 | 5/2016 | Ota et al. |
| 2016/0149216 A1 | 5/2016 | Mizuno et al. |
| 2016/0181585 A1 | 6/2016 | Choi et al. |
| 2016/0181611 A1 | 6/2016 | Cho et al. |
| 2016/0204431 A1 | 7/2016 | Sawa |
| 2016/0218341 A1 | 7/2016 | Kumar et al. |
| 2016/0240896 A1 | 8/2016 | Zhang et al. |
| 2016/0248086 A1 | 8/2016 | Ohsawa et al. |
| 2016/0260966 A1 | 9/2016 | Ohsawa et al. |
| 2016/0301075 A1 | 10/2016 | Zhamu et al. |
| 2016/0310924 A1 | 10/2016 | Nakatomi et al. |
| 2016/0329567 A1 | 11/2016 | Lee et al. |
| 2016/0336625 A1 | 11/2016 | Jeong et al. |
| 2016/0344033 A1 | 11/2016 | Kasamatsu et al. |
| 2016/0344035 A1 | 11/2016 | Zhamu et al. |
| 2016/0351877 A1 | 12/2016 | Kusachi et al. |
| 2016/0351909 A1 | 12/2016 | Bittner et al. |
| 2016/0372743 A1 | 12/2016 | Cho et al. |
| 2016/0372784 A1 | 12/2016 | Hayner et al. |
| 2017/0002154 A1 | 1/2017 | Hiasa et al. |
| 2017/0005369 A1 | 1/2017 | Nakagawa et al. |
| 2017/0018799 A1 | 1/2017 | Jeong |
| 2017/0018805 A1* | 1/2017 | Yoshida ............ H01M 10/0567 |
| 2017/0033357 A1 | 2/2017 | Cho et al. |
| 2017/0047584 A1 | 2/2017 | Hwang et al. |

(56) References Cited

U.S. PATENT DOCUMENTS

| | | | |
|---|---|---|---|
| 2017/0062827 A1 | 3/2017 | Bruckmeier et al. | |
| 2017/0062830 A1 | 3/2017 | Bao et al. | |
| 2017/0092986 A1 | 3/2017 | Ogawa et al. | |
| 2017/0098824 A1 | 4/2017 | Fasching et al. | |
| 2017/0098856 A1 | 4/2017 | Zhamu et al. | |
| 2017/0104204 A1 | 4/2017 | Zhamu et al. | |
| 2017/0104217 A1 | 4/2017 | Yu et al. | |
| 2017/0117535 A1 | 4/2017 | Yoon et al. | |
| 2017/0117538 A1 | 4/2017 | Bendimerad et al. | |
| 2017/0117589 A1 | 4/2017 | Tajima et al. | |
| 2017/0141387 A1 | 5/2017 | Hayner et al. | |
| 2017/0141399 A1 | 5/2017 | Lux et al. | |
| 2017/0162868 A1 | 6/2017 | Kim et al. | |
| 2017/0166722 A1 | 6/2017 | Zhamu et al. | |
| 2017/0179468 A1 | 6/2017 | Fanous et al. | |
| 2017/0194640 A1 | 7/2017 | Bucur et al. | |
| 2017/0194648 A1 | 7/2017 | Bucur et al. | |
| 2017/0200943 A1 | 7/2017 | Kawakami | |
| 2017/0207484 A1 | 7/2017 | Zhamu et al. | |
| 2017/0244098 A1 | 8/2017 | Duong et al. | |
| 2017/0279125 A1 | 9/2017 | Ohsawa et al. | |
| 2017/0288211 A1* | 10/2017 | Zhamu | H01M 4/386 |
| 2017/0294643 A1 | 10/2017 | Burshtain et al. | |
| 2017/0309917 A1 | 10/2017 | Lee et al. | |
| 2017/0324097 A1 | 11/2017 | Lee et al. | |
| 2017/0338472 A1 | 11/2017 | Zhamu et al. | |
| 2017/0338474 A1 | 11/2017 | Lee et al. | |
| 2017/0338490 A1 | 11/2017 | Xiao et al. | |
| 2018/0013138 A1 | 1/2018 | Chen et al. | |
| 2018/0053978 A1 | 2/2018 | Song et al. | |
| 2018/0083265 A1 | 3/2018 | Singh et al. | |
| 2018/0190975 A1 | 7/2018 | Ishii et al. | |
| 2018/0191026 A1 | 7/2018 | Thielen et al. | |
| 2018/0219215 A1 | 8/2018 | Bucur et al. | |
| 2018/0233736 A1 | 8/2018 | Zhamu et al. | |
| 2018/0241031 A1 | 8/2018 | Pan et al. | |
| 2018/0241032 A1 | 8/2018 | Pan et al. | |
| 2018/0248173 A1 | 8/2018 | Pan et al. | |
| 2018/0277913 A1 | 9/2018 | Pan et al. | |
| 2018/0287142 A1 | 10/2018 | Zhamu et al. | |
| 2018/0294475 A1 | 10/2018 | Zhamu et al. | |
| 2018/0294476 A1 | 10/2018 | Zhamu et al. | |
| 2018/0301707 A1 | 10/2018 | Pan et al. | |
| 2019/0051905 A1 | 2/2019 | Zhamu et al. | |
| 2019/0058185 A1 | 2/2019 | Lee et al. | |
| 2019/0077669 A1 | 3/2019 | Zhamu et al. | |
| 2019/0081325 A1 | 3/2019 | Takeda et al. | |
| 2019/0088958 A1 | 3/2019 | Viner et al. | |
| 2019/0260028 A1 | 8/2019 | Zhamu et al. | |
| 2019/0319303 A1 | 10/2019 | Kushida et al. | |
| 2019/0386332 A1 | 12/2019 | Zhamu et al. | |
| 2019/0393466 A1 | 12/2019 | Lin et al. | |
| 2019/0393495 A1 | 12/2019 | He et al. | |
| 2019/0393510 A1 | 12/2019 | He et al. | |
| 2019/0393543 A1 | 12/2019 | Zhamu et al. | |
| 2020/0266406 A1 | 8/2020 | Cheng et al. | |

FOREIGN PATENT DOCUMENTS

| | | |
|---|---|---|
| CN | 104103809 A | 10/2014 |
| CN | 105322132 A | 2/2016 |
| CN | 108899472 A | 11/2018 |
| EP | 2787563 A1 | 10/2014 |
| JP | 1275613 A | 11/1989 |
| JP | 2010040218 A | 2/2010 |
| JP | 2010160984 A | 7/2010 |
| JP | 2011524611 A | 9/2011 |
| JP | 2015084320 A | 4/2015 |
| JP | 2015176656 A | 10/2015 |
| JP | 2017152123 A | 8/2017 |
| KR | 1020030050475 A | 6/2003 |
| KR | 100670527 B1 | 1/2007 |
| KR | 1020100138607 A | 12/2010 |
| KR | 1020140101640 A | 8/2014 |
| KR | 20160052351 A | 5/2016 |
| KR | 1020160085386 A | 7/2016 |
| KR | 1020160087511 A | 7/2016 |
| KR | 1020170001069 U | 3/2017 |
| KR | 1020170086003 A | 7/2017 |
| KR | 1020170126404 A | 11/2017 |
| KR | 1020180035752 A | 4/2018 |
| WO | 2007108424 A1 | 9/2007 |
| WO | 2015005117 A1 | 1/2015 |
| WO | 2015141799 A1 | 9/2015 |
| WO | 2016015915 A1 | 2/2016 |
| WO | 2017034656 A1 | 3/2017 |
| WO | 2017172104 A1 | 10/2017 |
| WO | 2017200798 A1 | 11/2017 |
| WO | 2018075538 A1 | 4/2018 |
| WO | 2018148090 A1 | 8/2018 |

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.

An et al., "Large-Scale Synthesis of High Quality Trigonal Selenium Nanowires" European Journal of Inorganic Chemistry (2003) vol. 17, pp. 3250-3255.

Arai et al., "Versatile supramolecular cross-linker: a rotaxane cross-linker that directly endows vinyl polymers with movable cross-links" Chemistry (2013) vol. 19, pp. 5917-5923.

AZO Materials Table of Properties on Styrene Butadiene Rubber, 5 pages.

Buonerba et al., "Novel Synthetic Strategy for the Sulfonation of Polybutadiene and Styrene-Butadiene Copolymers" Macromolecules (2013) vol. 46, pp. 778-784.

Chen et al., "Selenium nanowires and nanotubes synthesized via a facile template-free solution method" Materials Research Bulletin (2010) vol. 45, pp. 699-704.

Choi et al., "Highly elastic binders integrating polyrotaxanes for silicon microparticle anodes in lithium ion batteries" Science (2017) vol. 357, No. 6348, pp. 279-283.

Dwivedi et al., "An Organic Acid-induced Synthesis and Characterization of Selenium Nanoparticles" Journal of Nanotechnology (2011) Article ID 651971, 6 pages.

Elabd et al., "Sulfonation and Characterization of Poly(styrene-isobutylene-styrene) Triblock Copolymers at High Ion-Exchange Capacities" Polymer (2004) vol. 45, pp. 3037-3043.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.

Ji et al., "A highly ordered nanostructured carbon-sulphur cathode for lithium-sulphur batteries" Nature Materials (2009) vol. 8, pp. 500-506.

Karlicky et al., "Halogenated Graphenes: Rapidly Growing Family of Graphene Derivatives" ACS Nano (2013) vol. 7, No. 8, pp. 6434-6464.

KR -10-2015-0044333 English language translation.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Liu et al., "Solutions for the problems of silicon-carbon anode materials for lithium-ion batteries" Royal Society Open Science (2018) vol. 5, p. 172370.

Luesakul et al., "Shape-controlled synthesis of cubic-like selenium nanoparticles via the self-assembly method" Carbohydrate Polymers (2016) vol. 153, pp. 435-444.

(56) References Cited

OTHER PUBLICATIONS

PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25160 International Search Report and Written Opinion dated Nov. 21, 2018, 12 pages.
PCT/US18/25163 International Search Report and Written Opinion dated Jul. 27, 2018, 19 pages.
PCT/US18/43421 International Search Report and Written Opinion dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/20214 International Search Report and Written Opinion dated May 2, 2019, 7 pages.
PCT/US19/20222 International Search Report and Written Opinion dated May 3, 2019, 7 pages.
PCT/US19/21137 International Search Report and Written Opinion dated Jun. 18, 2019, 13 pages.
PCT/US19/27147 International Search Report and Written Opinion dated Aug. 1, 2019, 16 pages.
PCT/US19/36748 International Search Report and Written Opinion dated Oct. 16, 2019, 11 pages.
PCT/US19/37690 International Search Report and Written Opinion dated Oct. 18, 2019, 18 pages.
PCT/US19/37692 International Search Report and Written Opinion dated Oct. 21, 2019, 18 pages.
PCT/US19/37700 International Search Report and Written Opinion dated Oct. 23, 2019, 17 pages.
PCT/US19/38367 International Search Report and Written Opinion dated Oct. 18, 2019, 17 pages.
PCT/US19/38368 International Search Report and Written Opinion dated Oct. 18, 2019, 18 pages.
PCT/US19/38436 International Search Report and Written Opinion dated Oct. 16, 2019, 17 pages.
PCT/US19/38455 International Search Report and Written Opinion dated Oct. 18, 2019, 10 pages.
PCT/US19/38456 International Search Report and Written Opinion dated Oct. 16, 2019, 16 pages.
CN 2018800380346; Chinese Office Action dated Oct. 29, 2021; 21 pages.
Feng et al., Silicon-based anodes for lithium-ion batteries: from fundamentals to practical applications, Small, 14 (2018), p. 1702737 (Year 2018).
JP 2019-544068; Japanese Office Action dated Nov. 30, 2021; 3 pages.
JP 2019-546030; Japanese Office Action dated Jan. 4, 2022; 5 pages.
JP 2019555198; Japanese Office Action dated Nov. 9, 2021; 5 pages.
U.S. Appl. No. 15/434,632 Final Office Action dated Jan. 4, 2021, 20 pages.
U.S. Appl. No. 15/903,788 Final Office Action dated Feb. 1, 2021, 9 pages.
U.S. Appl. No. 15/903,808 Nonfinal Office Action dated Mar. 19, 2021, 8 pages.
U.S. Appl. No. 15/954,046 Nonfinal Office Action dated Nov. 20, 2020, 10 pages.
U.S. Appl. No. 16/010,213 Nonfinal Office Action dated Jan. 6, 2021, 10 pages.
U.S. Appl. No. 16/109,178 Nonfinal Office Action dated Feb. 5, 2021, 11 pages.
U.S. Appl. No. 16/112,225 Nonfinal Office Action dated Mar. 18, 2021, 10 pages.
U.S. Appl. No. 16/113,676 Advisory Action dated Sep. 14, 2021, 8 pages.
U.S. Appl. No. 16/113,676 Nonfinal Office Action dated Dec. 24, 2020, 12 pages.
U.S. Appl. No. 16/120,875 Nonfinal Office Action dated Dec. 30, 2020, 14 pages.
U.S. Appl. No. 16/123,218 Nonfinal Office Action dated Dec. 30, 2020, 11 pages.
U.S. Appl. No. 16/123,218; Office Action dated Dec. 9, 2021; 48 pages.
U.S. Appl. No. 16/160,257 Final Office Action dated Jul. 26, 2021, 37 pages.
U.S. Appl. No. 16/160,257 Nonfinal Office Action dated Mar. 26, 2021, 31 pages.
U.S. Appl. No. 16/166,536 Final Office Action dated Nov. 18, 2020, 7 pages.
U.S. Appl. No. 16/166,574 Nonfinal Office Action dated Dec. 30, 2020, 9 pages.
U.S. Appl. No. 16/238,052 Final Office Action dated Jul. 20, 2021; 34 pages.
U.S. Appl. No. 16/238,052 Nonfinal Office Action dated Mar. 26, 2021, 16 pages.
U.S. Appl. No. 16/256,321 Final Office Action dated Nov. 3, 2020, 8 pages.
U.S. Appl. No. 16/256,346 Non-Final Office Action dated Oct. 27, 2021; 48 pages.
U.S. Appl. No. 16/256,346 Final Office Action dated Dec. 8, 2020, 18 pages.
U.S. Appl. No. 16/014,623 Nonfinal Office Action dated Dec. 24, 2020, 11 pages.
PCT/US19/38881 International Search Report and Written Opinion dated Oct. 18, 2019, 14 pages.
PCT/US19/47642 International Search Report and Written Opinion dated Dec. 6, 2019, 16 pages.
PCT/US19/48084 International Search Report and Written Opinion dated Dec. 16, 2019, 9 pages.
PCT/US19/55758 International Search Report and Written Opinion dated Jan. 31, 2020, 15 pages.
PCT/US20/14869 International Search Report and Written Opinion dated May 19, 2020, 13 pages.
U.S. Appl. No. 14/999,080 Nonfinal Office Action dated Nov. 9, 2018,.
U.S. Appl. No. 14/999,080 Nonfinal Office Action dated Oct. 30, 2019, 15 pages.
U.S. Appl. No. 15/434,632 Final Office Action dated Dec. 26, 2019, 20 pages.
U.S. Appl. No. 15/434,632 Nonfinal Office Action dated Jun. 26, 2020, 19 pages.
U.S. Appl. No. 15/442,278 Final Office Action dated Oct. 21, 2019, 16 pages.
U.S. Appl. No. 15/442,278 Nonfinal Office Action dated Feb. 28, 2020, 16 pages.
U.S. Appl. No. 15/442,803 Final Office Action dated Feb. 24, 2020, 36 pages.
U.S. Appl. No. 15/442,803 Nonfinal Office Action dated Dec. 28, 2018, 24 pages.
U.S. Appl. No. 15/442,803 Nonfinal Office Action dated Jul. 20, 2020, 8 pages.

(56) References Cited

OTHER PUBLICATIONS

U.S. Appl. No. 15/442,803 Nonfinal Office Action dated Jul. 25, 2019, 37 pages.
U.S. Appl. No. 15/442,807 Nonfinal Office Action dated Dec. 14, 2018, 7 pages.
U.S. Appl. No. 15/478,125 Final Office Action dated Aug. 23, 2019, 14 pages.
U.S. Appl. No. 15/478,125 Final Office Action dated Sep. 3, 2020, 19 pages.
U.S. Appl. No. 15/478,125 Nonfinal Office Action dated Mar. 5, 2020, 11 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Final Office Action dated Dec. 27, 2019, 22 pages.
U.S. Appl. No. 15/483,347 Nonfinal Office Action dated Jun. 17, 2020, 14 pages.
U.S. Appl. No. 15/483,347 Nonfinal Office Action dated Nov. 2, 2018, 20 pages.
U.S. Appl. No. 15/483,347 Nonfinal Office Action dated Sep. 17, 2019, 20 pages.
U.S. Appl. No. 15/483,348 Advisory Action dated Jul. 18, 2019, 9 pages.
U.S. Appl. No. 15/483,348 Final Office Action dated Apr. 9, 2019, 28 pages.
U.S. Appl. No. 15/483,348 Final Office Action dated Jan. 20, 2020, 9 pages.
U.S. Appl. No. 15/483,348 Nonfinal Office Action dated Nov. 21, 2018, 22 pages.
U.S. Appl. No. 15/483,348 Nonfinal Office Action dated Sep. 16, 2019, 22 pages.
U.S. Appl. No. 15/485,934 Nonfinal Office Action dated May 26, 2020, 12 pages.
U.S. Appl. No. 15/676,677 Nonfinal Office Action dated Feb. 5, 2020, 15 pages.
U.S. Appl. No. 15/676,680 Nonfinal Office Action dated May 20, 2020, 8 pages.
U.S. Appl. No. 15/901,367 Nonfinal Office Action dated Jun. 10, 2019, 12 pages.
U.S. Appl. No. 15/903,788 Nonfinal Office Action dated Jun. 4, 2020, 11 pages.
U.S. Appl. No. 15/903,808 Final Office Action dated May 15, 2020, 9 pages.
U.S. Appl. No. 15/903,808 Nonfinal Office Action dated Jan. 28, 2020, 8 pages.
U.S. Appl. No. 15/910,465 Final Office Action dated May 15, 2020, 13 pages.
U.S. Appl. No. 15/910,465 Nonfinal Office Action dated Nov. 1, 2019, 12 pages.
U.S. Appl. No. 15/910,471 Nonfinal Office Action dated May 13, 2020, 11 pages.
U.S. Appl. No. 15/910,471 Non-final Office Action dated Nov. 8, 2019, 12 pages.
U.S. Appl. No. 15/914,213 Nonfinal Office Action dated Aug. 31, 2020, 8 pages.
U.S. Appl. No. 15/914,216 Final Office Action dated Dec. 19, 2019, 9 pages.
U.S. Appl. No. 15/954,088 Final Office Action dated Aug. 7, 2020, 8 pages.
U.S. Appl. No. 15/954,088 Nonfinal Office Action dated Mar. 13, 2020, 9 pages.
U.S. Appl. No. 16/010,213 Final Office Action dated Jun. 15, 2018, 10 pages.
U.S. Appl. No. 16/010,213 Nonfinal Office Action dated Mar. 27, 2020, 12 pages.
U.S. Appl. No. 16/010,225 Final Office Action dated Jul. 8, 2020, 7 pages.
U.S. Appl. No. 16/010,225 Nonfinal Office Action dated Mar. 27, 2020, 13 pages.
U.S. Appl. No. 16/010,965 Nonfinal Office Action dated Jan. 8, 2020, 5 pages.
U.S. Appl. No. 16/010,975 Nonfinal Office Action dated Jan. 8, 2020, 5 pages.
U.S. Appl. No. 16/014,623 Final Office Action dated Apr. 9, 2020, 14 pages.
U.S. Appl. No. 16/014,623 Nonfinal Office Action dated Oct. 4, 2019, 8 pages.
U.S. Appl. No. 16/017,294 Nonfinal Office Action dated Jan. 23, 2020, 6 pages.
U.S. Appl. No. 16/109,142 Nonfinal Office Action dated Oct. 13, 2020, 9 pages.
U.S. Appl. No. 16/112,208 Nonfinal Office Action dated Apr. 2, 2020, 7 pages.
U.S. Appl. No. 16/112,225 Final Office Action dated Oct. 1, 2020, 12 pages.
U.S. Appl. No. 16/112,225 Nonfinal Office Action dated May 13, 2020, 9 pages.
U.S. Appl. No. 16/113,676 Nonfinal Office Action dated Oct. 4, 2019, 9 pages.
U.S. Appl. No. 16/113/676 Final Office Action dated Apr. 9, 2020, 15 pages.
U.S. Appl. No. 16/114,959 Final Office Action dated Jul. 22, 2020, 6 pages.
U.S. Appl. No. 16/116,329 Final Office Action dated Jul. 23, 2020, 6 pages.
U.S. Appl. No. 16/116,329 Nonfinal Office Action dated Mar. 30, 2020, 6 pages.
U.S. Appl. No. 16/116,341 Final Office Action dated Jul. 23, 2020, 6 pages.
U.S. Appl. No. 16/116,341 Nonfinal Office Action dated Mar. 30, 2020, 6 pages.
U.S. Appl. No. 16/120,875 Final Office Action dated Apr. 9, 2020, 14 pages.
U.S. Appl. No. 16/120,875 Nonfinal Office Action dated Oct. 4, 2019, 10 pages.
U.S. Appl. No. 16/123,218 Final Office Action dated Apr. 9, 2020, 13 pages.
U.S. Appl. No. 16/123,218 Nonfinal Office Action dated Oct. 4, 2019, 9 pages.
U.S. Appl. No. 16/126,736 Final Office Action dated Jul. 23, 2020, 6 pages.
U.S. Appl. No. 16/126,736 Nonfinal Office Action dated Mar. 30, 2020, 6 pages.
U.S. Appl. No. 16/126,745 Final Office Action dated Jul. 23, 2020, 6 pages.
U.S. Appl. No. 16/126,745 Nonfinal Office Action dated Mar. 30, 2020, 6 pages.
U.S. Appl. No. 16/160,257 Final Office Action dated Oct. 14, 2020, 15 pages.
U.S. Appl. No. 16/160,257 Nonfinal Office Action dated Apr. 3, 2020, 16 pages.
U.S. Appl. No. 16/166,536 Nonfinal Office Action dated May 14, 2020, 5 pages.
U.S. Appl. No. 16/166,574 Final Office Action dated Apr. 9, 2020, 12 pages.
U.S. Appl. No. 16/166,574 Nonfinal Office Action dated Oct. 4, 2019, 9 pages.
U.S. Appl. No. 16/238,052 Final Office Action dated Oct. 14, 2020, 15 pages.
U.S. Appl. No. 16/238,052 Nonfinal Office Action dated Apr. 3, 2020, 14 pages.
U.S. Appl. No. 16/238,061 Nonfinal Office Action dated Aug. 14, 2020, 8 pages.
U.S. Appl. No. 16/256,321 Nonfinal Office Action dated Jul. 27, 2020, 8 pages.
U.S. Appl. No. 16/256,346 Nonfinal Office Action dated May 19, 2020, 16 pages.

(56) References Cited

OTHER PUBLICATIONS

Vaikhanski et al., "Fiber-reinforced composite foam from expandable PVC microspheres" Composites Part A (2003) vol. 34, pp. 1245-1253.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.

\* cited by examiner

POLYMER BINDER FOR LITHIUM BATTERY AND METHOD OF MANUFACTURING

CROSS REFERENCE TO RELATED APPLICATIONS

The present application is a continuation-in-part of U.S. patent application Ser. No. 15/442,278 filed Feb. 24, 2017, the contents of which are hereby incorporated by reference for all purposes.

FIELD

The present disclosure relates generally to the field of rechargeable lithium battery and, more particularly, to the lithium battery anode and cell, and the method of manufacturing same.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the anode layer is used to bond the anode active material (e.g. graphite or Si particles) and a conductive filler (e.g. carbon black particles or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode active material layer (or, simply, anode layer) and the latter one forms another discrete layer.

A binder resin (e.g. PVDF or PTFE) is also used in the cathode to bond cathode active materials and conductive additive particles together to form a cathode active layer of structural integrity. The same resin binder also acts to bond this cathode active layer to a cathode current collector.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2, in an anode composed of these high-capacity anode active materials, severe pulverization (fragmentation of the alloy particles) and detachment of active material particles from the resin binder occur during the charge and discharge cycles. These are due to severe expansion and contraction of the anode active material particles induced by the insertion and extraction of the lithium ions in and out of these particles. The expansion and contraction, the resulting pulverization, of active material particles and detachment from the resin binder lead to loss of contacts between active material particles and conductive additives and loss of contacts between the anode active material and its current collector. These adverse effects result in a significantly shortened charge-discharge cycle life.

To overcome some of the problems associated with such mechanical degradation, three technical approaches have been proposed:
(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.
(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nano particles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a composite material and other approaches that can effectively reduce or eliminate the expansion/shrinkage-induced problems of the anode active material in a lithium-ion battery. Thus, there is an urgent and continuing need for a new protective or binder material that enables a lithium-ion battery to exhibit a long cycle life. There is also a need for a method of readily or easily producing such a material in large quantities.

Thus, it is an object of the present disclosure to meet these needs and address the issues associated the rapid capacity decay of a lithium battery containing a high-capacity anode active material.

SUMMARY

Herein reported is an anode active material layer for a lithium battery that contains a very unique class of binder resin. This binder resin contains a high-elasticity polymer that is capable of overcoming the rapid capacity decay problem commonly associated with a lithium-ion battery that features a high-capacity anode active material, such as Si, Sn, and $SnO_2$.

Specifically, the disclosure provides an anode active material layer for a lithium battery. This layer comprises multiple anode active material particles and an optional conductive additive (e.g. particles of carbon black, acetylene black, expanded graphite flakes, carbon nanotubes, graphene sheets, carbon nano-fibers, etc.) that are bonded together by a binder resin to form an anode active layer of structural integrity. This binder resin comprises a high-elasticity polymer having a recoverable tensile strain (elastic deformation) no less than 5% when measured without an additive or reinforcement in the polymer and a lithium ion conductivity no less than $10^{-5}$ S/cm at room temperature.

The high-elasticity polymer has a recoverable tensile strain no less than 5% (typically 10-700%, more typically 30-500%, further more typically and desirably >50%, and most desirably >100%) when measured without an additive or reinforcement in the polymer under uniaxial tension. The polymer also has a lithium ion conductivity no less than $10^{-5}$ S/cm at room temperature (preferably and more typically no less than $10^{-4}$ S/cm and more preferably and typically no less than $10^{-3}$ S/cm). The anode active material preferably has a specific capacity of lithium storage greater than 372 mAh/g, which is the theoretical capacity of graphite.

High-elasticity polymer refers to a polymer, typically a lightly cross-linked polymer, which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable upon release of the load and the recovery process is essentially instantaneous. The elastic deformation is preferably greater than 30%, more preferably greater than 50%, further more preferably greater than 100%, still more preferably greater than 150%, and most preferably greater than 200%.

In some preferred embodiments, the high-elasticity polymer contains a lightly cross-linked network of polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof, in the cross-linked network of polymer chains. These network or cross-linked polymers exhibit a unique combination of a high elasticity (high elastic deformation strain) and high lithium-ion conductivity.

In certain preferred embodiments, the high-elasticity polymer contains a lightly cross-linked network polymer chains selected from nitrile-containing polyvinyl alcohol chains, cyanoresin chains, pentaerythritol tetraacrylate (PETEA) chains, pentaerythritol triacrylate chains, ethoxylated trimethylolpropane triacrylate (ETPTA) chains, ethylene glycol methyl ether acrylate (EGMEA) chains, or a combination thereof.

In this anode active material layer, the anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) prelithiated versions thereof; (g) particles of Li, Li alloy, or surface-stabilized Li having at least 60% by weight of lithium element therein; and (h) combinations thereof.

In some preferred embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2.

It may be noted that pre-lithiation of an anode active material means that this material has been pre-intercalated by or doped with lithium ions up to a weight fraction from 0.1% to 54.7% of Li in the lithiated product.

The anode active material is preferably in a form of nano particle (spherical, ellipsoidal, and irregular shape), nano wire, nano fiber, nano tube, nano sheet, nano belt, nano ribbon, nano disc, nano platelet, or nano horn having a thickness or diameter less than 100 nm. These shapes can be collectively referred to as "particles" unless otherwise specified or unless a specific type among the above species is desired. Further preferably, the anode active material has a dimension less than 50 nm, even more preferably less than 20 nm, and most preferably less than 10 nm.

In some embodiments, multiple particles are bonded by the high-elasticity polymer-based binder resin. A carbon layer may be deposited to embrace the anode active material particles prior to being bonded by the resin binder.

The anode active material layer may further contain a graphite, graphene, or carbon material mixed with the active material particles in the anode active material layer. The carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof. Graphene may be selected from pristine graphene, graphene oxide, reduced graphene oxide, graphene fluoride, hydrogenated graphene, nitrogenated graphene, functionalized graphene, etc.

The anode active material particles may be coated with or embraced by a conductive protective coating, selected from a carbon material, graphene, electronically conductive polymer, conductive metal oxide, or conductive metal coating. Preferably, the anode active material, in the form of a nano particle, nano wire, nano fiber, nano tube, nano sheet, nano belt, nano ribbon, nano disc, nano platelet, or nano horn is pre-intercalated or pre-doped with lithium ions to form a prelithiated anode active material having an amount of lithium from 0.1% to 54.7% by weight of said prelithiated anode active material.

Preferably and typically, the high-elasticity polymer has a lithium ion conductivity no less than $10^{-5}$ S/cm, more preferably no less than $10^{-4}$ S/cm, and most preferably no less than $10^{-3}$ S/cm. Some of the selected polymers exhibit a lithium-ion conductivity greater than $10^{-2}$ S/cm. In some embodiments, the high-elasticity polymer is a neat polymer containing no additive or filler dispersed therein. In others, the high-elasticity polymer is a polymer matrix composite containing from 0.1% to 50% by weight (preferably from 1% to 35% by weight) of a lithium ion-conducting additive dispersed in a high-elasticity polymer matrix material. In some embodiments, the high-elasticity polymer contains from 0.1% by weight to 10% by weight of a reinforcement nano filament selected from carbon nanotube, carbon nanofiber, graphene, or a combination thereof.

In some embodiments, the high-elasticity polymer is mixed with an elastomer selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, the high-elasticity polymer is a polymer matrix composite containing a lithium ion-conducting additive (0.1% to 50% by wt.) dispersed in a high-elasticity polymer matrix material, wherein the lithium ion-conducting additive is selected from $Li_2CO_3$, $Li_2O$, $Li_2C_2O_4$, LiOH, LiX, $ROCO_2Li$, HCOLi, ROLi, ($ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In some embodiments, the high-elasticity polymer is a polymer matrix composite containing a lithium ion-conducting additive dispersed in a high-elasticity polymer matrix material, wherein the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The high-elasticity polymer may form a mixture or blend with an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer may form a mixture or blend with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer.

The present disclosure also provides a lithium battery containing an optional anode current collector, the presently invented anode active material layer as described above, a cathode active material layer, an optional cathode current collector, an electrolyte in ionic contact with the anode active material layer and the cathode active material layer and an optional porous separator. The lithium battery may be a lithium-ion battery, lithium metal battery (containing lithium metal or lithium alloy as the main anode active material and containing no intercalation-based anode active material), lithium-sulfur battery, lithium-selenium battery, or lithium-air battery.

The present disclosure also provides a method of manufacturing a lithium battery. The method includes (a) providing a cathode active material layer and an optional cathode current collector to support the cathode active material layer; (b) providing an anode active material layer and an optional anode current collector to support the anode active material layer; and (c) providing an electrolyte in contact with the anode active material layer and the cathode active material layer and an optional separator electrically separating the anode and the cathode; wherein the operation of providing the anode active material layer includes bonding multiple particles of an anode active material and an optional conductive additive together to form the layer by a binder resin containing a high-elasticity polymer having a recoverable tensile strain from 5% to 700% when measured without an additive or reinforcement and a lithium ion conductivity no less than $10^{-5}$ S/cm at room temperature.

Preferably, the high-elasticity polymer has a lithium ion conductivity from $1\times10^{-5}$ S/cm to $2\times10^{-2}$ S/cm. In some embodiments, the high-elasticity polymer has a recoverable tensile strain from 10% to 300% (more preferably >50%, and most preferably >100%).

In certain preferred embodiments, the high-elasticity polymer contains a cross-linked network polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof in the cross-linked network of polymer chains.

Preferably, in the method, the high-elasticity polymer contains a cross-linked network of polymer chains selected from nitrile-containing polyvinyl alcohol chains, cyanoresin chains, pentaerythritol tetraacrylate chains, pentaerythritol triacrylate chains, ethoxylated trimethylolpropane triacrylate (ETPTA) chains, ethylene glycol methyl ether acrylate (EGMEA) chains, or a combination thereof.

In certain embodiments, the binder resin contains a mixture/blend/composite of a high-elasticity polymer with an elastomer, an electronically conductive polymer (e.g. polyaniline, polypyrrole, polythiophene, polyfuran, a bi-cyclic polymer, a sulfonated derivative thereof, or a combination thereof), a lithium-ion conducting material, a reinforcement material (e.g. carbon nanotube, carbon nano-fiber, and/or graphene), or a combination thereof.

In this mixture/blend/composite, the lithium ion-conducting material is dispersed in the high-elasticity polymer and is preferably selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

In some embodiments, the lithium ion-conducting material is dispersed in the high-elasticity polymer and is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In the invented method, the anode active material is selected from the group consisting of: (a) silicon (Si), germanium (Ge), tin (Sn), zinc (Zn), aluminum (Al), titanium (Ti), nickel (Ni), cobalt (Co), and cadmium (Cd); (b) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (c) lithium titanate, lithium manganate, lithium aluminate, lithium-containing titanium oxide, lithium transition metal oxide, $ZnCo_2O_4$; (d) prelithiated versions thereof; (e) mixtures thereof with a carbon, graphene, or graphite material; (f) particles of Li, Li alloy, or surface-stabilized Li having at least 60% by weight of lithium element therein; and (f) combinations thereof.

Preferably, the anode active material particles are coated with a layer of carbon or graphene prior to being bonded by the high-elasticity polymer. Preferably, anode active material particles and particles of a carbon or graphite material are bonded together by the high-elasticity polymer. Preferably, the anode active material particles, possibly along with a carbon or graphite material and/or with some internal graphene sheets, are embraced by graphene sheets to form anode active material particulates, which are then bonded by the high-elasticity polymer. The graphene sheets may be selected from pristine graphene (e.g. that prepared by CVD or liquid phase exfoliation using direct ultrasonication), graphene oxide, reduced graphene oxide (RGO), graphene fluoride, doped graphene, functionalized graphene, etc.

The present disclosure also provides another method of manufacturing a lithium battery. The method comprises: (a) providing a cathode active material layer and an optional cathode current collector to support the cathode active material layer; (b) Providing an anode active material layer and an optional anode current collector to support the anode active material layer; and (c) providing an electrolyte in contact with the anode active material layer and the cathode active material layer and porous separator electrically separating the anode and the cathode; wherein the operation of providing the anode active material layer includes bonding multiple particles of an anode active material and an optional conductive additive together by a binder resin to form the anode active material layer and applying a thin film of a high-elasticity polymer to cover and protect the anode active material layer, wherein the high-elasticity polymer has a recoverable or elastic tensile strain from 5% to 700% when measured without an additive or reinforcement and a lithium ion conductivity no less than $10^{-5}$ S/cm at room temperature and the thin film has a thickness from 1 nm to 10 μm. This thin film of high-elasticity polymer is implemented between the anode active material layer and the porous separator.

DESCRIPTION OF THE PREFERRED EMBODIMENTS

This disclosure is directed at the anode active material layer (negative electrode layer, not including the anode current collector) containing a high-capacity anode material for a lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration or any type of electrolyte. For convenience, we will primarily use Si, Sn, and $SnO_2$ as illustrative examples of a high-capacity anode active material. This should not be construed as limiting the scope of the disclosure.

Figure 1A:
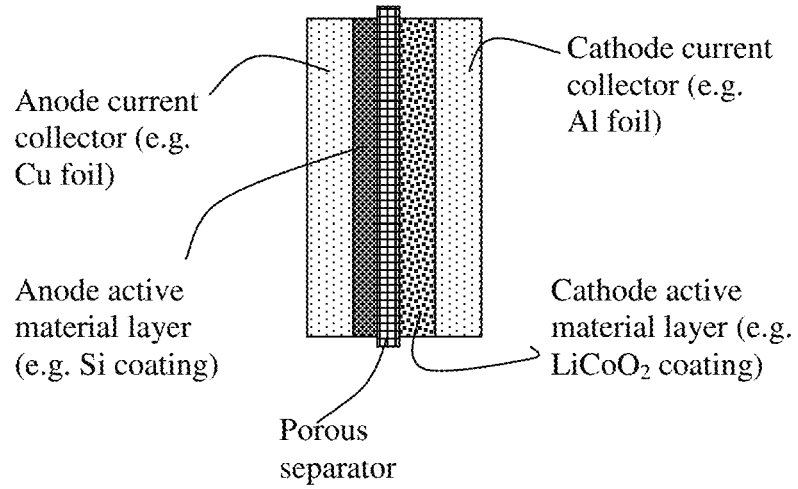
FIG. 1(A) Schematic of a prior art lithium-ion battery cell, wherein the anode layer is a thin coating of an anode active material itself.
Figure 1B:
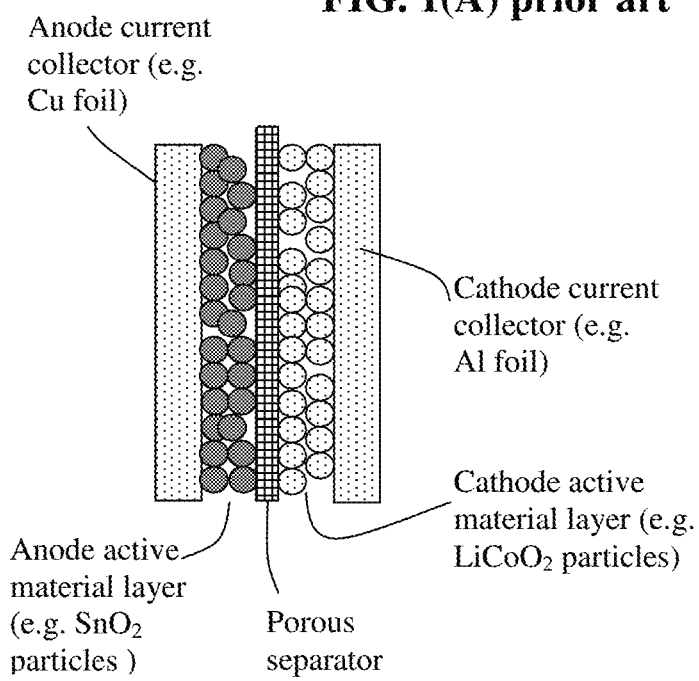
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

In a less commonly used cell configuration, as illustrated in FIG. 1(A), the anode active material is deposited in a thin film form directly onto an anode current collector, such as a layer of Si coating deposited on a sheet of copper foil. This is not commonly used in the battery industry and, hence, will not be discussed further.

In order to obtain a higher energy density cell, the anode in FIG. 1(B) can be designed to contain higher-capacity anode active materials having a composition formula of $Li_aA$ (A is a metal or semiconductor element, such as Al and Si, and "a" satisfies 0<a≤5). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials.

Figure 2:
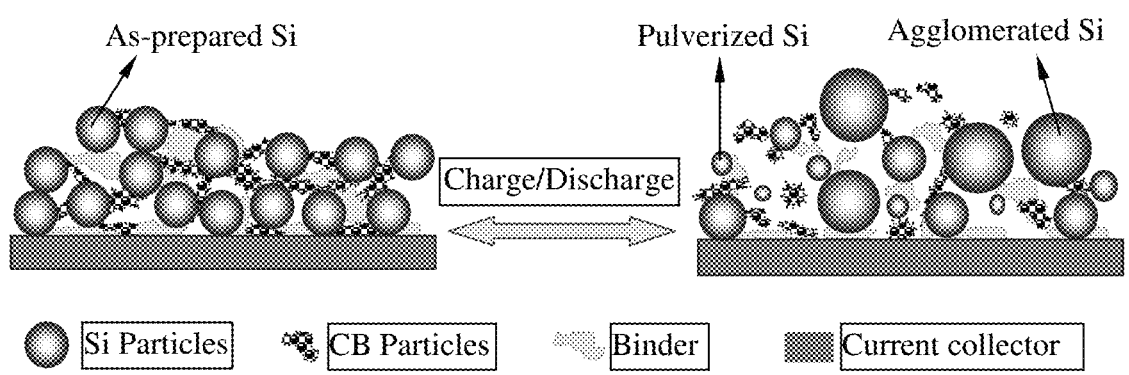
FIG. 2 Schematic illustrating the notion that expansion of Si particles, upon lithium intercalation during charging of a prior art lithium-ion battery, can lead to pulverization of Si particles, detachment of resin binder from the particles, and interruption of the conductive paths formed by the conductive additive, and loss of contact with the current collector.

As schematically illustrated in FIG. 2, one major problem is the notion that, in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction of the active material particles leads to the pulverization of active material particles and detachment of the binder resin from the particles, resulting in loss of contacts between active material particles and conductive additives and loss of contacts between the anode active material and its current collector. These adverse effects result in a significantly shortened charge-discharge cycle life.

We have solved these challenging issues that have troubled battery designers and electrochemists alike for more than 30 years by developing a new class of binder resin to hold the particles of the anode active material together.

Figure 7:
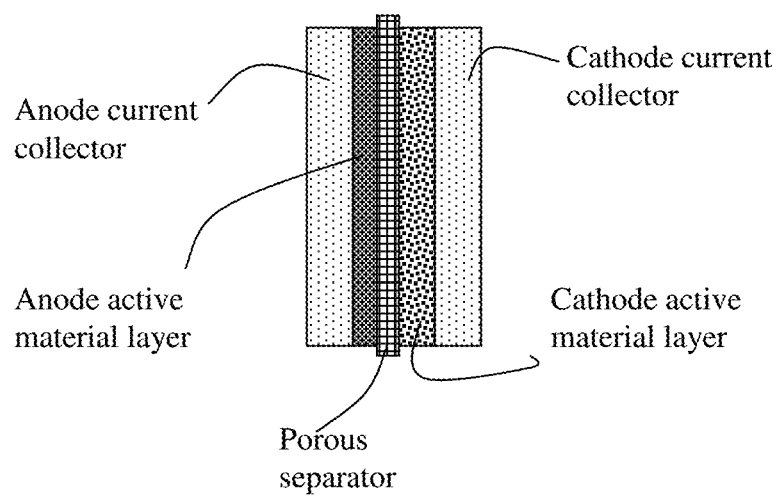
FIG. 7 Schematic of one possible embodiment of the present disclosure, a battery with an anode, a cathode, an anode current collector, a cathode current collector, and a porous separator, where the electrolyte is in contact with the anode, cathode, and separator.

FIG. 7 shows an embodiment of the present disclosure. Shown is a battery with an anode, a cathode, an anode current collector, a cathode current collector, and a porous separator, where the electrolyte is in contact with the anode, cathode, and separator.

The anode active material layer comprises multiple anode active material particles and conductive additive particles that are bonded together by a high-elasticity polymer having a recoverable tensile strain no less than 5% when measured without an additive or reinforcement in the polymer under uniaxial tension and a lithium ion conductivity no less than $10^{-5}$ S/cm at room temperature (preferably and more typically no less than $10^{-4}$ S/cm and more preferably and typically no less than $10^{-3}$ S/cm). The anode active material is preferably a high-capacity anode material that has a specific capacity of lithium storage greater than 372 mAh/g, the theoretical capacity of graphite.

High-elasticity polymer refers to a polymer, typically a lightly cross-linked polymer, which exhibits an elastic deformation that is at least 5% when measured (without an additive or reinforcement in the polymer) under uniaxial tension. In the field of materials science and engineering, the "elastic deformation" is defined as a deformation of a material (when being mechanically stressed) that is essentially fully recoverable and the recovery is essentially instantaneous upon release of the load. The elastic deformation is preferably greater than 30%, more preferably greater than 50%, further more preferably greater than 100%, still more preferably greater than 150%, and most preferably greater than 200%. The preferred types of high-capacity polymers will be discussed later.

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) prelithiated versions thereof; (g) particles of Li, Li alloy, or surface-stabilized Li; and (h) combinations thereof. Particles of Li or Li alloy (Li alloy containing from 0.1% to 10% by weight of Zn, Ag, Au, Mg, Ni, Ti, Fe, Co, or V element), particularly surface-stabilized Li particles (e.g. wax-coated Li particles), were found to be good anode active material per se or an extra lithium source to compensate for the loss of Li ions that are otherwise supplied only from the cathode active material. The presence of these Li or Li-alloy particles encapsulated inside an elastomeric shell was found to significantly improve the cycling performance of a lithium cell.

Pre-lithiation of an anode active material can be conducted by several methods (chemical intercalation, ion implementation, and electrochemical intercalation). Among these, the electrochemical intercalation is the most effective. Lithium ions can be intercalated into non-Li elements (e.g. Si, Ge, and Sn) and compounds (e.g. $SnO_2$ and $Co_3O_4$) up to a weight percentage of 54.68% (see Table 1 below). For Zn, Mg, Ag, and Au encapsulated inside an elastomer shell, the amount of Li can reach 99% by weight.

TABLE 1

Lithium storage capacity of selected non-Li elements.

| Intercalated compound | Atomic weight of Li, g/mole | Atomic weight of active material, g/mole | Max. wt. % of Li |
|---|---|---|---|
| $Li_4Si$ | 6.941 | 28.086 | 49.71 |
| $Li_{4.4}Si$ | 6.941 | 28.086 | 54.68 |
| $Li_{4.4}Ge$ | 6.941 | 72.61 | 30.43 |
| $Li4.4Sn$ | 6.941 | 118.71 | 20.85 |
| $Li_3Cd$ | 6.941 | 112.411 | 14.86 |
| $Li_3Sb$ | 6.941 | 121.76 | 13.93 |
| $Li_{4.4}Pb$ | 6.941 | 207.2 | 13.00 |
| $LiZn$ | 6.941 | 65.39 | 7.45 |
| $Li_3Bi$ | 6.941 | 208.98 | 8.80 |

The particles of the anode active material may be in the form of a nano particle, nano wire, nano fiber, nano tube, nano sheet, nano platelet, nano disc, nano belt, nano ribbon, or nano horn. They can be non-lithiated (when incorporated into the anode active material layer) or prelithiated to a desired extent (up to the maximum capacity as allowed for a specific element or compound.

Preferably and typically, the high-elasticity polymer has a lithium ion conductivity no less than $10^{-5}$ S/cm, more preferably no less than $10^{-4}$ S/cm, further preferably no less than $10^{-3}$ S/cm, and most preferably no less than $10^{-2}$ S/cm. In some embodiments, the high-elasticity polymer is a neat polymer having no additive or filler dispersed therein. In others, the high-elasticity polymer is a polymer matrix composite containing from 0.1% to 50% (preferably 1% to 35%) by weight of a lithium ion-conducting additive dispersed in a high-elasticity polymer matrix material. The high-elasticity polymer must have a high elasticity (elastic deformation strain value >10%). An elastic deformation is a deformation that is fully recoverable and the recovery process is essentially instantaneous (no significant time delay). The high-elasticity polymer can exhibit an elastic deformation from 5% up to 1,000% (10 times of its original length), more typically from 10% to 800%, and further more typically from 50% to 500%, and most typically and desirably from 70% to 300%. It may be noted that although a metal typically has a high ductility (i.e. can be extended to a large extent without breakage), the majority of the deformation is plastic deformation (non-recoverable) and only a small amount of elastic deformation (typically <1% and more typically <0.2%).

In some preferred embodiments, the high-elasticity polymer contains a lightly cross-linked network polymer chains having an ether linkage, nitrile-derived linkage, benzo peroxide-derived linkage, ethylene oxide linkage, propylene oxide linkage, vinyl alcohol linkage, cyano-resin linkage, triacrylate monomer-derived linkage, tetraacrylate monomer-derived linkage, or a combination thereof, in the cross-linked network of polymer chains. These network or crosslinked polymers exhibit a unique combination of a high elasticity (high elastic deformation strain) and high lithium-ion conductivity.

In certain preferred embodiments, the high-elasticity polymer contains a lightly cross-linked network polymer chains selected from nitrile-containing polyvinyl alcohol chains, cyanoresin chains, pentaerythritol tetraacrylate (PETEA) chains, pentaerythritol triacrylate chains, ethoxylated trimethylolpropane triacrylate (ETPTA) chains, ethylene glycol methyl ether acrylate (EGMEA) chains, or a combination thereof.

Typically, a high-elasticity polymer is originally in a monomer or oligomer states that can be cured to form a cross-linked polymer that is highly elastic. Prior to curing, these polymers or oligomers are soluble in an organic solvent to form a polymer solution. Particles of an anode active material (e.g. $SnO_2$ nano particles and Si nano-wires) can be dispersed in this polymer solution to form a suspension (dispersion or slurry) of an active material particle-polymer (monomer or oligomer) mixture. This suspension can then be subjected to a solvent removal treatment while individual particles remain substantially separated from one another. The polymer (or monomer or oligomer) precipitates out to deposit on surfaces of these active material particles. This can be accomplished, for instance, via spray drying, ultrasonic spraying, air-assisted spraying, aerosolization, and other secondary particle formation procedures.

For instance, ethoxylated trimethylopropane triacrylate monomer (ETPTA, Mw=428, chemical formula given below), along with an initiator, can be dissolved in an organic solvent, such as ethylene carbonate (EC) or diethyl carbonate (DEC). Then, anode active material particles (Si, Sn, $SnO_2$, and $Co_3O_4$ particles, etc.) can be dispersed in the ETPTA monomer/solvent/initiator solution to form a slurry, which can be spray-dried to form ETPTA monomer/initiator-embraced anode particles. These embraced particles can then be thermally cured to obtain the particulates composed of anode particles encapsulated with a thin layer of a high-elasticity polymer. The polymerization and cross-linking reactions of this monomer can be initiated by a radical initiator derived from benzoyl peroxide (BPO) or AIBN through thermal decomposition of the initiator molecule. The ETPTA monomer has the following chemical formula:

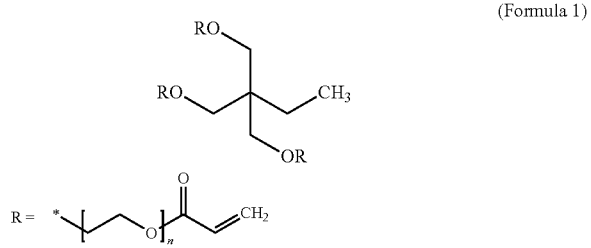

(Formula 1)

As another example, the high-elasticity polymer for encapsulation may be based on cationic polymerization and cross-linking of the cyanoethyl polyvinyl alcohol (PVA-CN, Formula 2) in succinonitrile (SN).

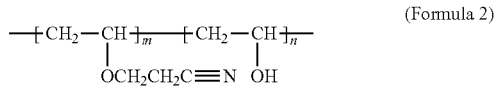

(Formula 2)

The procedure may begin with dissolving PVA-CN in succinonitrile ($NCCH_2CH_2CN$) to form a mixture solution. This is followed by adding an initiator into the mixture solution. For instance, $LiPF_6$ can be added into the PVA-CN/SN mixture solution at a weight ratio (selected from the preferred range from 20:1 to 2:1) to form a precursor solution. Then, particles of a selected anode active material are introduced into the mixture solution to form a slurry. The slurry may then be subjected to a micro-encapsulation procedure to produce anode active material particles coated with an embracing layer of reacting mass, PVA-CN/$LiPF_6$. These embraced particles can then be heated at a temperature (e.g. from 75 to 100° C.) for 2 to 8 hours to obtain high-elasticity polymer-encapsulated anode active material particles. During this process, cationic polymerization and cross-linking of cyano groups on the PVA-CN may be initiated by $PF_5$, which is derived from the thermal decomposition of $LiPF_6$ at such an elevated temperature.

It is essential for these materials to form a lightly cross-linked network of polymer chains that chemically bond to the active material particles. In other words, the network polymer or cross-linked polymer should have a relatively low degree of cross-linking or low cross-link density to impart a high elastic deformation.

The cross-link density of a cross-linked network of polymer chains may be defined as the inverse of the molecular weight between cross-links (Mc). The cross-link density can be determined by the equation, Mc=ρRT/Ge, where Ge is the equilibrium modulus as determined by a temperature sweep in dynamic mechanical analysis, ρ is the physical density, R is the universal gas constant in J/mol*K and T is absolute temperature in K. Once Ge and ρ are determined experimentally, then Mc and the cross-link density can be calculated.

The magnitude of Mc may be normalized by dividing the Mc value by the molecular weight of the characteristic repeat unit in the cross-link chain or chain linkage to obtain a number, Nc, which is the number of repeating units between two cross-link points. We have found that the elastic deformation strain correlates very well with Mc and Nc. The elasticity of a cross-linked polymer derives from a large number of repeating units (large Nc) between cross-links. The repeating units can assume a more relax conformation (e.g. random coil) when the polymer is not stressed. However, when the polymer is mechanically stressed, the linkage chain uncoils or gets stretched to provide a large deformation. A long chain linkage between cross-link points (larger Nc) enables a larger elastic deformation. Upon release of the load, the linkage chain returns to the more relaxed or coiled state. During mechanical loading of a polymer, the cross-links prevent slippage of chains that otherwise form plastic deformation (non-recoverable).

Preferably, the Nc value in a high-elasticity polymer is greater than 5, more preferably greater than 10, further more preferably greater than 100, and even more preferably greater than 200. These Nc values can be readily controlled and varied to achieve different elastic deformation values by using different cross-linking agents with different functionalities, and by designing the polymerization and cross-linking reactions to proceed at different temperatures for different periods of time.

Alternatively, Mooney-Rilvin method may be used to determine the degree of cross-linking. Crosslinking also can be measured by swelling experiments. In a swelling experiment, the crosslinked sample is placed into a good solvent for the corresponding linear polymer at a specific temperature, and either the change in mass or the change in volume is measured. The higher the degree of crosslinking, the less swelling is attainable. Based on the degree of swelling, the Flory Interaction Parameter (which relates the solvent interaction with the sample, Flory Huggins Eq.), and the density of the solvent, the theoretical degree of crosslinking can be calculated according to Flory's Network Theory. The Flory-Rehner Equation can be useful in the determination of cross-linking.

The high-elasticity polymer may contain a simultaneous interpenetrating network (SIN) polymer, wherein two cross-linking chains intertwine with each other, or a semi-interpenetrating network polymer (semi-IPN), which contains a cross-linked polymer and a linear polymer. An example of semi-IPN is an UV-curable/polymerizable trivalent/monovalent acrylate mixture, which is composed of ethoxylated trimethylolpropane triacrylate (ETPTA) and ethylene glycol methyl ether acrylate (EGMEA) oligomers. The ETPTA, bearing trivalent vinyl groups, is a photo (UV)-crosslinkable monomer, capable of forming a network of cross-linked chains. The EGMEA, bearing monovalent vinyl groups, is also UV-polymerizable, leading to a linear polymer with a high flexibility due to the presence of the oligomer ethylene oxide units. When the degree of cross-linking of ETPTA is moderate or low, the resulting ETPTA/EGMEA semi-IPN polymer provides good mechanical flexibility or elasticity and reasonable mechanical strength. The lithium-ion conductivity of this polymer is in the range from $10^{-4}$ to $5 \times 10^{-3}$ S/cm.

The aforementioned high-elasticity polymers may be used alone to chemically bond the anode active material particles. Alternatively, the high-elasticity polymer can be mixed with a broad array of elastomers, electrically conducting polymers, lithium ion-conducting materials, and/or strengthening materials (e.g. carbon nanotube, carbon nano-fiber, or graphene sheets).

A broad array of elastomers can be mixed with a high-elasticity polymer to bond the anode active material particles together. The elastomeric material may be selected from natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually consists of two types of domains, soft domains and hard ones. Entangled linear backbone chains consisting of poly(tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

In some embodiments, a high-elasticity polymer can form a polymer matrix composite containing a lithium ion-conducting additive dispersed in the high-elasticity polymer matrix material, wherein the lithium ion-conducting additive is selected from $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2U)_2$, $Li_2S$, $Li_xSO_y$, or a combination thereof, wherein X=F, Cl, I, or Br, R=a hydrocarbon group, $0<x \leq 1$, $1 \leq y \leq 4$.

In some embodiments, the high-elasticity polymer can be mixed with a lithium ion-conducting additive, which contains a lithium salt selected from lithium perchlorate (LiClO_4), lithium hexafluorophosphate (LiPF_6), lithium borofluoride (LiBF_4), lithium hexafluoroarsenide (LiAsF_6), lithium trifluoro-methanesulfonate (LiCF_3SO_3), bis-trifluoromethyl sulfonylimide lithium (LiN(CF_3SO_2)_2), lithium bis(oxalato)borate (LiBOB), lithium oxalyldifluoroborate (LiBF_2C_2O_4), lithium nitrate (LiNO_3), Li-fluoroalkyl-phosphate (LiPF_3(CF_2CF_3)_3), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

The high-elasticity polymer may form a mixture, blend, or semi-interpenetrating network with an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer may form a mixture or with a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a derivative thereof (e.g. sulfonated versions), or a combination thereof.

Unsaturated rubbers that can be mixed with the high-elasticity polymer include natural polyisoprene (e.g. cis-1, 4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Each of these elastomers can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

The binder formulation typically requires the high-elasticity polymer or its precursor (monomer or oligomer) to be dissolvable in a solvent. Fortunately, all the high-elasticity polymers or their precursors used herein are soluble in some common solvents. The un-cured polymer or its precursor can be readily dissolved in a common organic solvent to form a solution. This solution can then be used to bond solid particles via several of the binder application methods to be discussed in what follows. Upon contact with active material particles, the precursor is then polymerized and cross-linked.

The first method includes dispersing the anode active materials particles into the polymer precursor solution to form a slurry, which is then coated onto a surface of a current collector (e.g. Cu foil). The liquid medium of the coated slurry is then removed to form a dried layer containing the active material particles and conductive additive particles each partially coated with the polymer pre-cursor (monomer or oligomer). This procedure is essentially identical or very similar to the slurry coating process currently commonly used in lithium-ion battery. Hence, there is no need to change the production equipment or facility. This dried layer is exposed to heat and/or UV light to initiate the polymerization and cross-linking reactions that harden the binder resin and bonds the solid particles together. Preferably, the amount of polymer is selected in such a manner that the binder resin only covers less than 50% (preferably <20%) of the exterior surface of an active material particle.

One may also use a modified pan coating process that involves tumbling the active material particles in a pan or a similar device while the precursor solution is applied slowly until a desired amount of contact between the polymer precursor and solid active material particles is achieved. The concentration of the monomer/oligomer in the solution is selected to ensure enough polymer to help bond the active particles together, but not to cover the entire exterior surface of active material particles. Preferably, a majority of the exterior surface of an active material particle is not covered by the polymer.

Solution spraying also may be used to apply a binder resin to surfaces of active material particles supported by a solid substrate. The polymer precursor solution, along with particles of active material and conductive additive, may be spray-coated onto a surface of a current collector. Upon removal of the liquid solvent, the dried mass is subjected to thermally or UV-induced polymerization and cross-linking.

Example 1: High-Elasticity Polymer-Bonded Cobalt Oxide ($Co_3O_4$) Anode Particulates An appropriate amount of inorganic salts $Co(NO_3)_2 \cdot 6H_2O$ and ammonia solution ($NH_3$—$H_2O$, 25 wt. %) were mixed together. The resulting suspension was stirred for several hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then made into an anode active material layer using an ETPTA-based high-elasticity polymer binder according to the following procedure:

The ethoxylated trimethylopropane triacrylate monomer (ETPTA, Mw=428, Sigma-Aldrich) was dissolved in a solvent mixture of ethylene carbonate (EC)/diethyl carbonate (DEC), at a weight-based composition ratios of the ETPTA/solvent of 3/97 (w/w). Subsequently, benzoyl peroxide (BPO, 1.0 wt. % relative to the ETPTA content) was added as a radical initiator to allow for thermal crosslinking reaction after mixing with anode particles. Then, anode active material particles ($Co_3O_4$ particles) and some CNTs (as a conductive additive) were dispersed in the ETPTA monomer/solvent/initiator solution to form a slurry, which was spray-coated onto a Cu foil surface to form a layer of mixture of ETPTA monomer/initiator, CNTs, and $Co_3O_4$ particles. This layer was then thermally cured at 60° C. for 30 min to obtain an anode active material layer composed of $Co_3O_4$ particles and CNTs that are bonded together by a high-elasticity polymer-based binder resin.

On a separate basis, some amount of the ETPTA monomer/solvent/initiator solution was cast onto a glass surface to form a wet film, which was thermally dried and then cured at 60° C. for 30 min to form a film of cross-linked polymer. In this experiment, the BPO/ETPTA weight ratio was varied from 0.1% to 4% to vary the degree of cross-linking in several different polymer films. Some of the cure polymer samples were subjected to dynamic mechanical testing to obtain the equilibrium dynamic modulus, Ge, for the determination of the number average molecular weight between two cross-link points (Mc) and the corresponding number of repeat units (Nc), as a means of characterizing the degree of cross-linking.

Figure 3A:
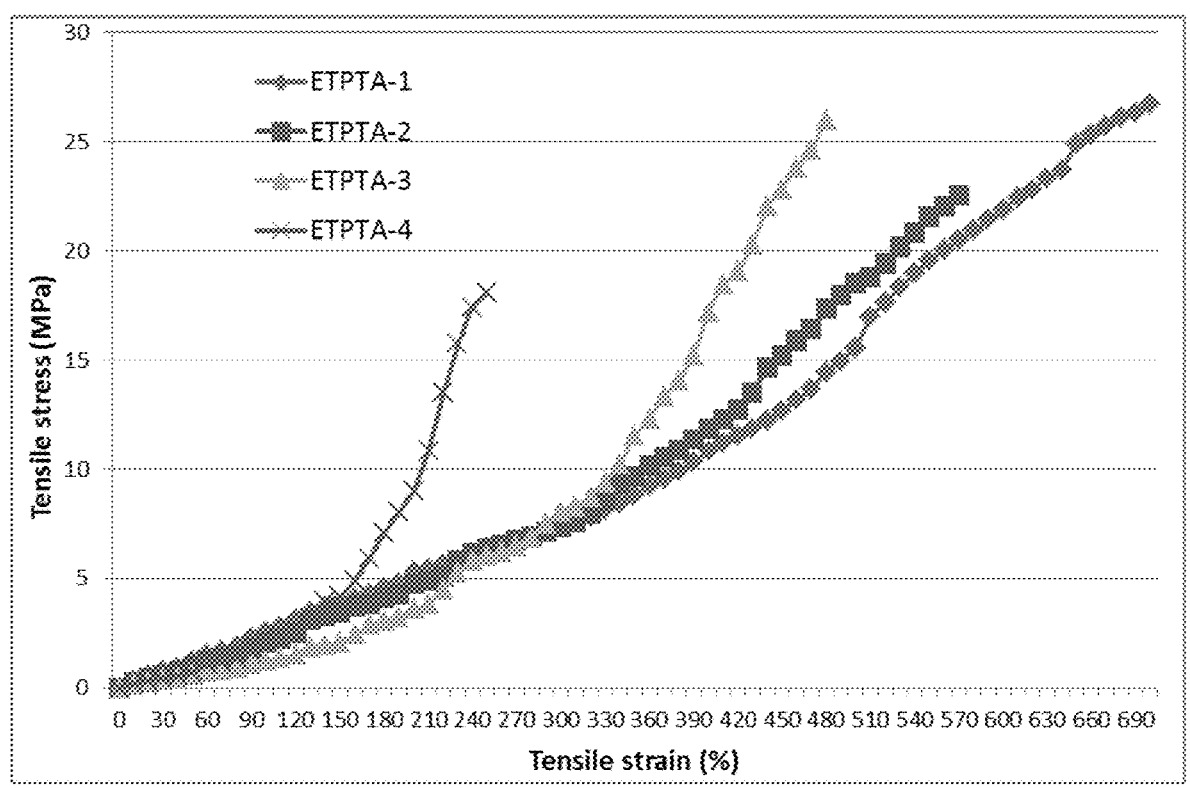
FIG. 3(A) Representative tensile stress-strain curves of four BPO-initiated cross-linked ETPTA polymers.

Several tensile testing specimens were cut from each cross-link film and tested with a universal testing machine. The representative tensile stress-strain curves of four BPO-initiated cross-linked ETPTA polymers are shown in FIG. 3(A), which indicate that this series of network polymers have an elastic deformation from approximately 230% to 700%. These above are for neat polymers without any additive. The addition of up to 30% by weight of a lithium salt typically reduces this elasticity down to a reversible tensile strain from 10% to 100%.

For electrochemical testing, a comparative electrode using a conventional binder resin is also prepared. The working electrodes were prepared by mixing 85 wt. % active material ($Co_3O_4$, particles, 7 wt. % CNTs, and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk ($\phi$=12 mm) and dried at 100° C. for 24 h in vacuum.

Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s.

Figure 3B:
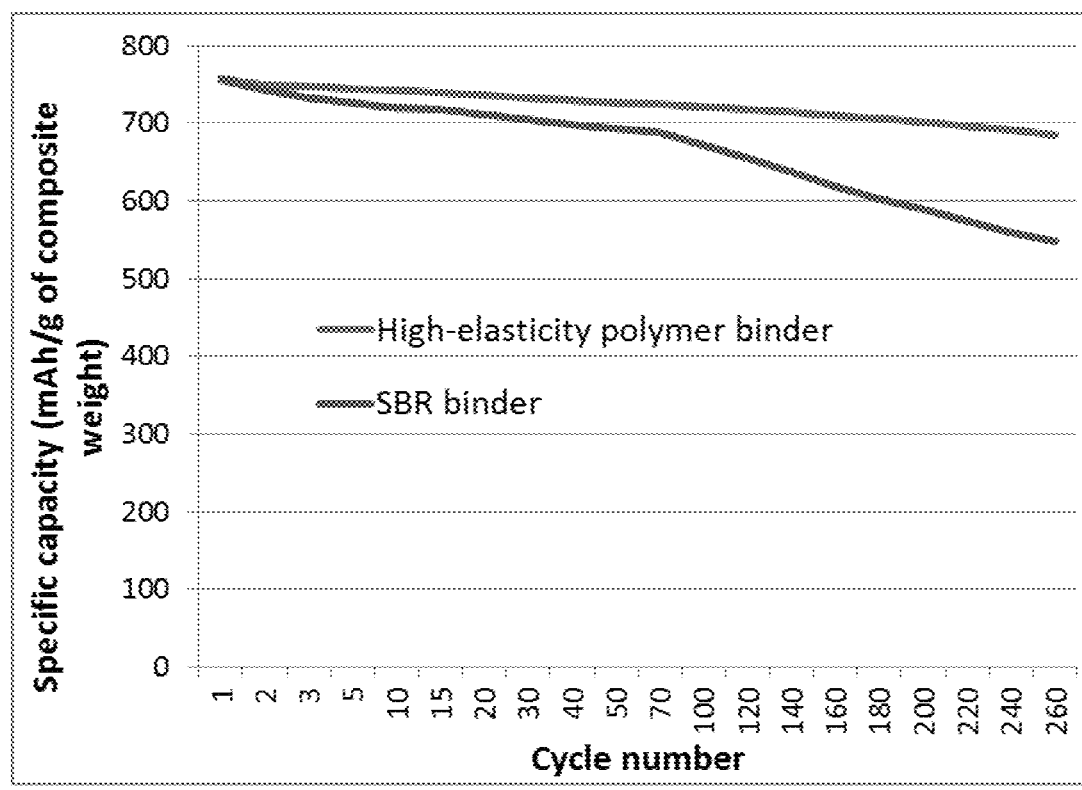
FIG. 3(B) The specific capacity values of two lithium battery cells having an anode active material featuring (1) ETPTA polymer binder-bonded $Co_3O_4$ particles and SBR rubber-bonded $Co_3O_4$ particles.

The electrochemical performance of the cell featuring high-elasticity polymer binder and that containing PVDF binder were evaluated by galvanostatic charge/discharge cycling at a current density of 50 mA/g, using a LAND electrochemical workstation. As summarized in FIG. 3(B), the first-cycle lithium insertion capacity values are 756 mAh/g (SBR binder) and 757 mAh/g (BPO-initiated ETPTA polymer-based binder), respectively, which are higher than the theoretical values of graphite (372 mAh/g). Both cells exhibit some first-cycle irreversibility. The initial capacity loss might have resulted from the incomplete conversion reaction and partially irreversible lithium loss due to the formation of solid electrolyte interface (SEI) layers.

As the number of cycles increases, the specific capacity of the SBR-bonded $Co_3O_4$ electrode drops precipitously. Compared with its initial capacity value of approximately 756 mAh/g, its capacity suffers a 20% loss after 175 cycles and a 27.51% loss after 260 cycles. In contrast, the presently invented high-elasticity polymer binder provides the battery cell with a significantly more stable and high specific capacity for a large number of cycles, experiencing a capacity loss of 9.51% after 260 cycles. These data have clearly demonstrated the surprising and superior performance of the presently invented high-elasticity polymer binder.

It may be noted that the number of charge-discharge cycles at which the specific capacity decays to 80% of its initial value is commonly defined as the useful cycle life of a lithium-ion battery.

The high-elasticity polymer binder appears to be capable of reversibly deforming without breakage when the anode active material particles expand and shrink. The polymer also remains chemically bonded to the anode active material particles when these particles expand or shrink. In contrast, the SBR binder is broken or detached from some of the active material particles. These were observed by using SEM to examine the surfaces of the electrodes recovered from the battery cells after some numbers of charge-discharge cycles.

Example 2: High-Elasticity Polymer Binder-Bonded Tin Oxide Particulates

Tin oxide ($SnO_2$) nano particles were obtained by the controlled hydrolysis of $SnCl_4 \cdot 5H_2O$ with NaOH using the following procedure: $SnCl_4 \cdot 5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 min. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere.

The high-elasticity polymer for binding $SnO_2$ nano particles was based on cationic polymerization and cross-linking of the cyanoethyl polyvinyl alcohol (PVA-CN) in succinonitrile (SN). The procedure began with dissolving PVA-CN in succinonitrile to form a mixture solution. This step was followed by adding an initiator into the solution. For the purpose of incorporating some lithium species into the high elasticity polymer, we chose to use $LiPF_6$ as an initiator. The ratio between $LiPF_6$ and the PVA-CN/SN mixture solution was varied from 1/20 to 1/2 by weight to form a series of precursor solutions. Subsequently, particles of a selected anode active material ($SnO_2$ and graphene-embraced $SnO_2$ particles) and acetylene black particles (as a conductive additive) were introduced into these solutions to form a series of slurries. The slurries were then separately coated onto a Cu foil surface to produce an anode active material layer. The layer was then heated at a temperature from 75 to 100° C. for 2 to 8 hours to obtain a layer of high-elasticity polymer-bonded anode active material particles.

Figure 4A:
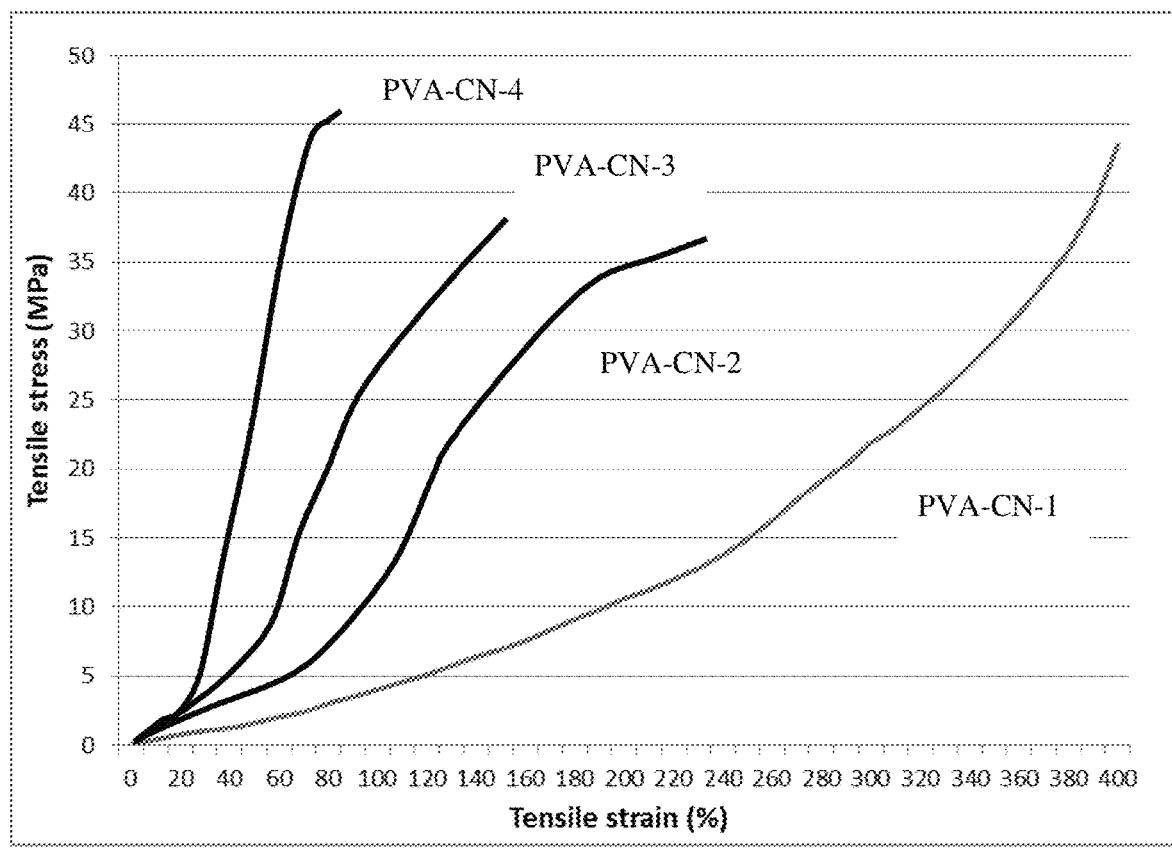
FIG. 4(A) Representative tensile stress-strain curves of four PF5-initiated cross-linked PVA-CN polymers.

Additionally, the reacting mass, PVA-CN/$LiPF_6$, was cast onto a glass surface to form several films which were polymerized and cross-linked to obtain cross-linked polymers having different degrees of cross-linking. Tensile testing was also conducted on these films and some testing results are summarized in FIG. 4(A). This series of cross-linked polymers can be elastically stretched up to approximately 80% (higher degree of cross-linking) to 400% (lower degree of cross-linking).

Figure 4B:
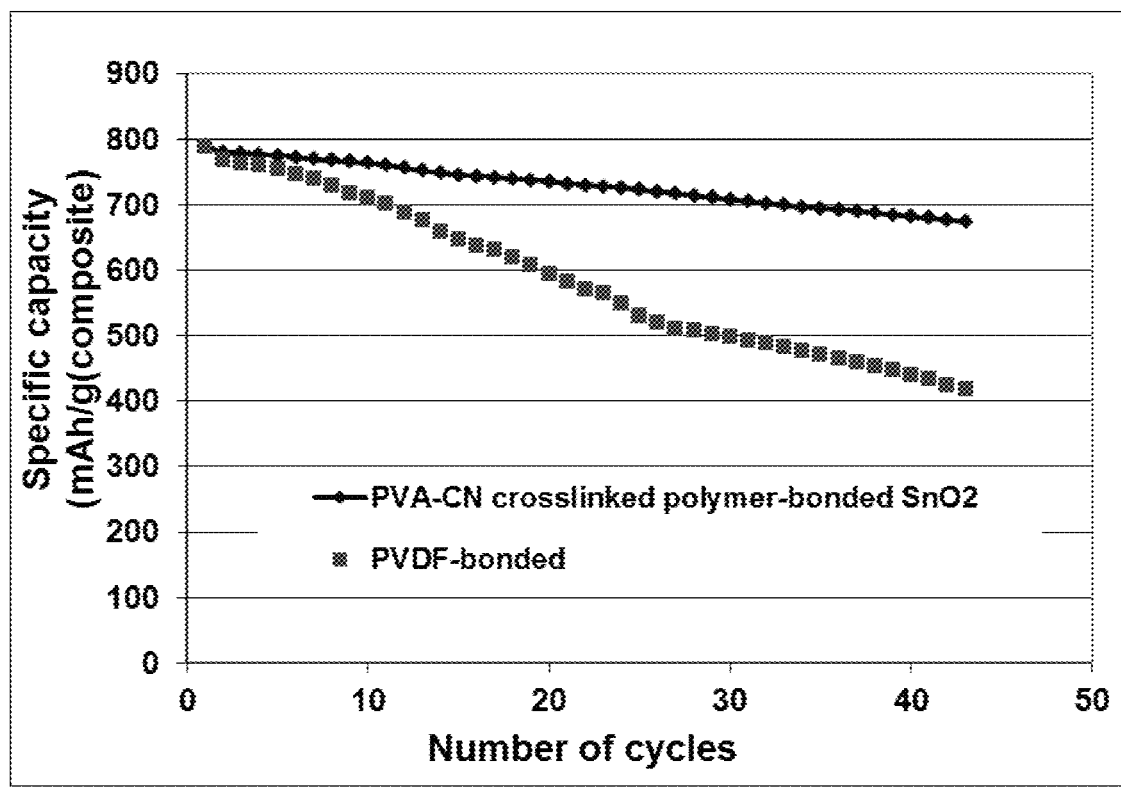
FIG. 4(B) The specific capacity values of two lithium battery cells having an anode active material featuring (1) high-elasticity PVA-CN polymer binder-bonded $SnO_2$ particles and (2) PVDF-bonded $SnO_2$ particles, respectively.

The battery cells from the high-elasticity polymer-bonded particles (nano-scaled $SnO_2$ particles) and PVDF-bonded $SnO_2$ particles were prepared using a procedure described in Example 1. FIG. 4(B) shows that the anode prepared according to the presently invented high-elasticity polymer binder approach offers a significantly more stable and higher reversible capacity compared to the PVDF-bonded $SnO_2$ particle-based anode. The high-elasticity polymer is more capable of holding the anode active material particles and conductive additive together, significantly improving the structural integrity of the active material electrode.

Example 3: Tin (Sn) Nano Particles Bonded by a PETEA-Based High-Elasticity Polymer For serving as a resin binder to bond Sn nano particles together, pentaerythritol tetraacrylate (PETEA), Formula 3, was used as a monomer:

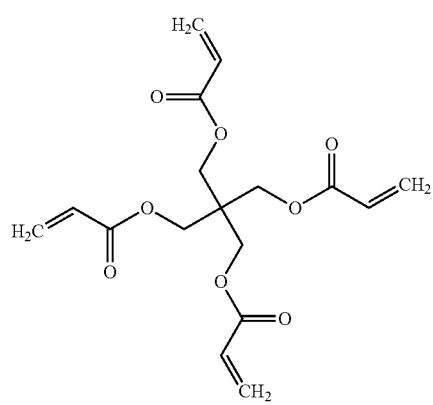

(Formula 3)

The precursor solution was composed of 1.5 wt. % PETEA ($C_{17}H_{20}O_8$) monomer and 0.1 wt. % azodiisobutyronitrile (AIBN, $C_8H_{12}N_4$) initiator dissolved in a solvent mixture of 1,2-dioxolane (DOL)/dimethoxymethane (DME) (1:1 by volume). Nano particles (76 nm in diameter) of Sn were added into the precursor solution, which was coated onto a Cu foil. The PETEA/AIBN precursor solution was polymerized and cured at 70° C. for half an hour to obtain an anode layer.

Figure 5A:
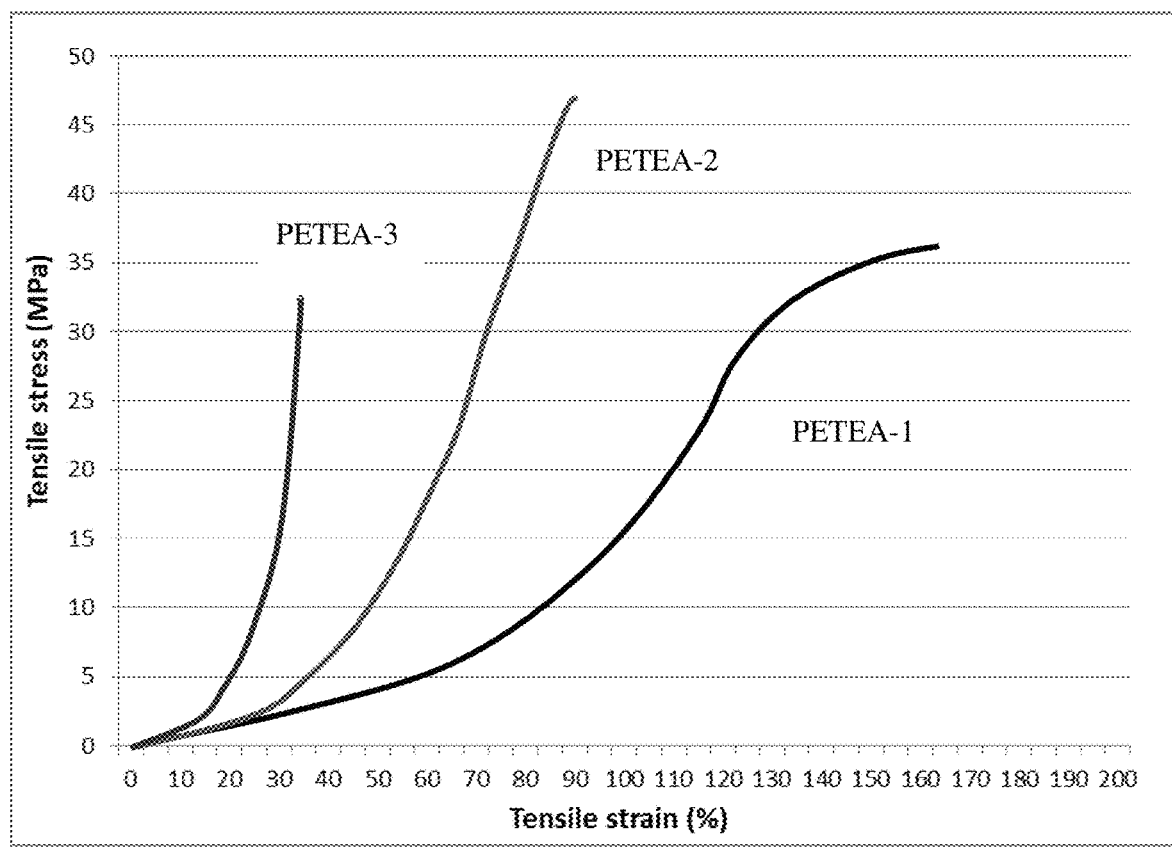
FIG. 5(A) Representative tensile stress-strain curves of three cross-linked PETEA polymers FIG. 5(B) The discharge capacity curves of four coin cells having four different types of anode active layers: (1) high-elasticity PETEA polymer binder-bonded, carbon-coated Sn particles, (2) high-elasticity PETEA polymer binder-bonded Sn particles; (3) SBR rubber-bonded, carbon-coated Sn particles; and (d) PVDF-bonded Sn particles.

The reacting mass, PETEA/AIBN (without Sn particles), was cast onto a glass surface to form several films which were polymerized and cured to obtain cross-linked polymers having different degrees of cross-linking. Tensile testing was also conducted on these films and some testing results are summarized in FIG. 5(A). This series of cross-linked polymers can be elastically stretched up to approximately 25% (higher degree of cross-linking) to 80% (lower degree of cross-linking)

Figure 5B:
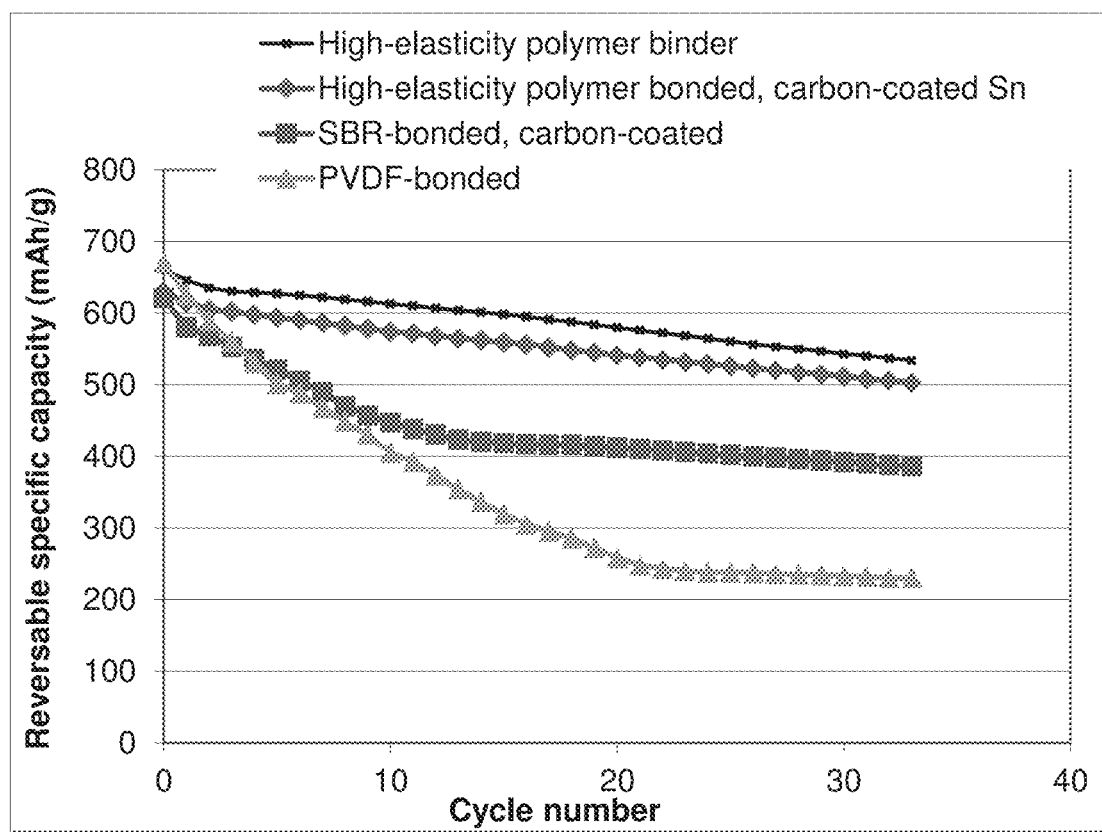

For comparison, some amount of Sn nano particles was bonded by SBR binder to make an anode. Shown in FIG. 5(B) are the discharge capacity curves of four coin cells having four different types of Sn-based anode layers: (1) high-elasticity PETEA polymer binder-bonded, carbon-coated Sn particles, (2) high-elasticity PETEA polymer binder-bonded Sn particles; (3) SBR rubber-bonded, carbon-coated Sn particles; and (d) PVDF-bonded Sn particles. These results have clearly demonstrated that the high-elasticity polymer binder strategy provides excellent protection against capacity decay of a lithium-ion battery featuring a high-capacity anode active material (having either encapsulated by carbon or non-encapsulated particles). Carbon encapsulation alone is not effective in providing the necessary protection against capacity decay.

The high-elasticity polymer binder appears to be capable of reversibly deforming without breakage when the anode active material particles expand and shrink. The polymer also remains chemically bonded to the anode active material particles when these particles expand or shrink. In contrast, both SBR and PVDF, the two conventional binder resins, are broken or detached from some of the active material particles. These were observed by using SEM to examine the surfaces of the electrodes recovered from the battery cells after some numbers of charge-discharge cycles.

Example 4: Si Nanowire-Based Particulates Protected by a High-Elasticity Polymer Si nano particles and Si nanowires Si nano particles are available from Angstron Energy Co. (Dayton, Ohio). Si nanowires, mixtures of Si and carbon, and their graphene sheets-embraced versions, respectively, were mixed with particles of acetylene black (a conductive additive) and formed into an active material layer using the instant polymers as a binder resin (semi-interpenetrating network polymer of ETPTA/EGMEA and the cross-linked BPO/ETPTA polymer, as in Example 1).

For bonding various anode particles together by the ETPTA semi-IPN polymer, the ETPTA (Mw=428 g/mol, trivalent acrylate monomer), EGMEA (Mw=482 g/mol, monovalent acrylate oligomer), and 2-hydroxy-2-methyl-1-phenyl-1-propanone (HMPP, a photoinitiator) were dissolved in a solvent (propylene carbonate, PC) to form a solution. The weight ratio between HMPP and the ETPTA/EGMEA mixture was varied from 0.2% to 2%. The ETPTA/EGMEA proportion in the solution was varied from 1% to 5% to generate different encapsulation layer thicknesses. The ETPTA/EGMEA ratio in the acrylate mixture was varied from 10/0 to 1/9.

Spray-coating was used to produce the electrode over a sheet of Cu foil. The active material layer containing ETPTA/EGMEA/HMPP was then exposed to UV irradiation for 20 s. The UV polymerization/cross-linking was conducted using a Hg UV lamp (100 W), having a radiation peak intensity of approximately 2000 mW/cm$^2$ on the surfaces of the electrodes.

Figure 6:
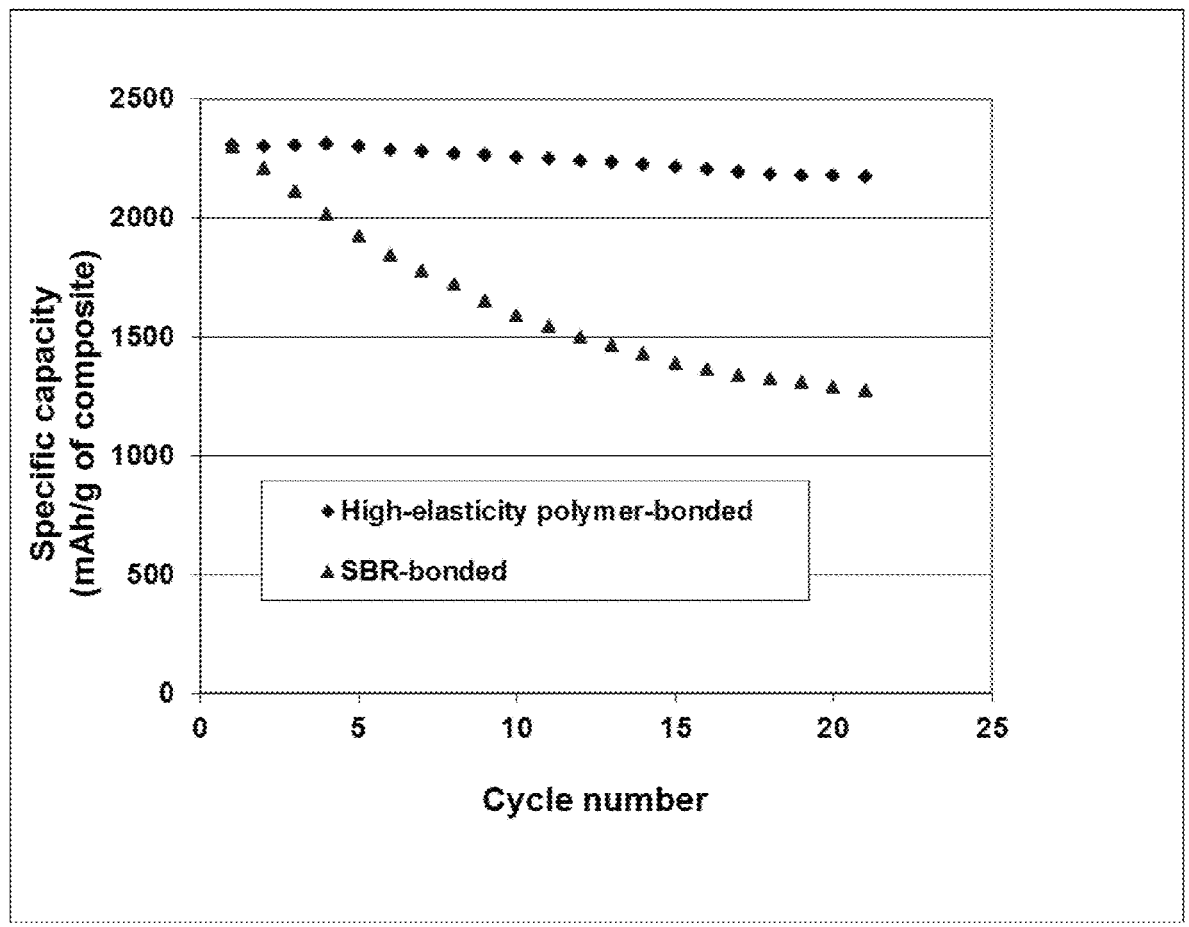
FIG. 6 Specific capacities of 2 lithium-ion cells each having Si nanowires (SiNW) as an anode active material: high-elasticity polymer binder-bonded SiNW and SBR rubber binder-bonded SiNW.

The above procedure was conducted to produce electrode layers that were bonded by a cross-linked ETPTA/EGMEA polymer. For comparison purposes, electrodes containing Si nanowires bonded by SBR binder were also prepared and implemented in separate lithium-ion cells. The cycling behaviors of these 2 cells are shown in FIG. 6, which indicates that high-elasticity polymer binder-bonded Si nanowires provide significantly more stable cycling response.

Example 5: Effect of Lithium Ion-Conducting Additive in a High-Elasticity Polymer Shell A wide variety of lithium ion-conducting additives were added to several different polymer matrix materials to prepare binder resin materials for maintaining structural integrity of electrodes. We have discovered that these polymer composite materials are suitable binder materials. Since the high-elasticity polymer can cover a significant portion of the active material particle surface, this polymer (with or without the lithium ion-conducting additive) must be capable of allowing lithium ions to readily diffuse through. Hence, the polymer must have a lithium ion conductivity at room temperature no less than $10^{-5}$ S/cm.

TABLE 2

Lithium ion conductivity of various high-elasticity polymer composite compositions as a shell material for protecting anode active material particles.

| Sample No. | Lithium-conducting additive | Elastomer (1-2 μm thick) | Li-ion conductivity (S/cm) |
|---|---|---|---|
| E-1b | $Li_2CO_3$ + $(CH_2OCO_2Li)_2$ | 70-99% PVA-CN | $2.9 \times 10^{-4}$ to $3.6 \times 10^{-3}$ S/cm |
| E-2b | $Li_2CO_3$ + $(CH_2OCO_2Li)_2$ | 65-99% ETPTA | $6.4 \times 10^{-4}$ to $2.3 \times 10^{-3}$ S/cm |
| E-3b | $Li_2CO_3$ + $(CH_2OCO_2Li)_2$ | 65-99% ETPTA/EGMEA | $8.4 \times 10^{-4}$ to $1.8 \times 10^{-3}$ S/cm |
| D-4b | $Li_2CO_3$ + $(CH_2OCO_2Li)_2$ | 70-99% PETEA | $7.8 \times 10^{-3}$ to $2.3 \times 10^{-2}$ S/cm |
| D-5b | $Li_2CO_3$ + $(CH_2OCO_2Li)_2$ | 75-99% PVA-CN | $8.9 \times 10^{-4}$ to $5.5 \times 10^{-3}$ S/cm |
| B1b | LiF + LiOH + $Li_2C_2O_4$ | 60-90% PVA-CN | $8.7 \times 10^{-5}$ to $2.3 \times 10^{-3}$ S/cm |
| B2b | LiF + HCOLi | 80-99% PVA-CN | $2.8 \times 10^{-4}$ to $1.6 \times 10^{-3}$ S/cm |
| B3b | LiOH | 70-99% PETEA | $4.8 \times 10^{-3}$ to $1.2 \times 10^{-2}$ S/cm |
| B4b | $Li_2CO_3$ | 70-99% PETEA | $4.4 \times 10^{-3}$ to $9.9 \times 10^{-3}$ S/cm |
| B5b | $Li_2C_2O_4$ | 70-99% PETEA | $1.3 \times 10^{-3}$ to $1.2 \times 10^{-2}$ S/cm |
| B6b | $Li_2CO_3$ + LiOH | 70-99% PETEA | $1.4 \times 10^{-3}$ to $1.6 \times 10^{-2}$ S/cm |
| C1b | $LiClO_4$ | 70-99% PVA-CN | $4.5 \times 10^{-4}$ to $2.4 \times 10^{-3}$ S/cm |
| C2b | $LiPF_6$ | 70-99% PVA-CN | $3.4 \times 10^{-4}$ to $7.2 \times 10^{-3}$ S/cm |
| C3b | $LiBF_4$ | 70-99% PVA-CN | $1.1 \times 10^{-4}$ to $1.8 \times 10^{-3}$ S/cm |
| C4b | LiBOB + $LiNO_3$ | 70-99% PVA-CN | $2.2 \times 10^{-4}$ to $4.3 \times 10^{-3}$ S/cm |
| S1b | Sulfonated polyaniline | 85-99% ETPTA | $9.8 \times 10^{-5}$ to $9.2 \times 10^{-4}$ S/cm |

TABLE 2-continued

Lithium ion conductivity of various high-elasticity polymer composite compositions as a shell material for protecting anode active material particles.

| Sample No. | Lithium-conducting additive | Elastomer (1-2 μm thick) | Li-ion conductivity (S/cm) |
|---|---|---|---|
| S2b | Sulfonated SBR | 85-99% ETPTA | $1.2 \times 10^{-4}$ to $1.0 \times 10^{-3}$ S/cm |
| S3b | Sulfonated PVDF | 80-99% ETPTA/EGMEA | $3.5 \times 10^{-4}$ to $2.1 \times 10^{-4}$ S/cm |
| S4b | Polyethylene oxide | 80-99% ETPTA/EGMEA | $4.9 \times 10^{-4}$ to $3.7 \times 103^{4}$ S/cm |

Example 6: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 3 below are the cycle life data of a broad array of batteries featuring presently invented electrodes containing anode active material particles bonded by different binder materials.

TABLE 3

Cycle life data of various lithium secondary (rechargeable) batteries.

| Sample ID | Binder resins | Type & % of anode active material | Initial capacity (mAh/g) | Cycle life (No. of cycles) |
|---|---|---|---|---|
| Si-1b | PVA-CN | 25% by wt. Si nano particles (80 nm) + 67% graphite + 8% binder | 1,120 | 1,150 |
| Si-2b | SBR | 25% by wt. Si nano particles (80 nm) + 67% graphite + 8% binder | 1,119 | 155 |
| SiNW-1b | SBR | 45% Si nano particles, pre-lithiated | 1,258 | 255 |
| SiNW-2b | PVA-CN + 50% ethylene oxide | 45% Si nano particles, pre-ithiated | 1,760 | 1,250 |
| VO$_2$-1b | ETPTA | 90%-95%, VO$_2$ nano ribbon | 255 | 1,140 |
| VO$_2$-2b | PVDF | 90%-95%, VO$_2$ nano ribbon | 720 | 147 |
| SnO$_2$-2b | ETPTA/EGMEA + 20% polyanniline | 75% SnO$_2$ particles (3 μm initial size) | 740 | 1,280 |
| SnO$_2$-2b | ETPTA/EGMEA | 75% SnO$_2$ particles (3 μm initial size) | 738 | 1,626 |
| Ge-1b | PETEA | 85% Ge + 8% graphite platelets + binder | 850 | 1,552 |
| Ge-2b | PVDF | 85% Ge + 8% graphite platelets + binder | 856 | 145 |

These data further confirm that the high-elasticity polymer binder strategy is surprisingly effective in alleviating the anode expansion/shrinkage-induced capacity decay problems.

We claim:

1. An anode active material layer for a lithium battery, said anode active material layer comprising multiple anode active material particles and a-conductive additive that are bonded together by a binder comprising a high-elasticity polymer having a recoverable tensile strain from 5% to 700% when measured without an additive or reinforcement in said polymer wherein said high-elasticity polymer contains a cross-linked network of polymer chains wherein said high-elasticity polymer comprises a polymer selected from natural polyisoprene, synthetic polyisoprene, polybutadiene, chloroprene rubber, polychloroprene, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof; wherein said anode active material contains a prelithiated Si, prelithiated Ge, prelithiated Sn, prelithiated SnO$_x$, prelithiated SiO$_x$, prelithiated iron oxide, prelithiated VO$_2$, prelithiated Co$_3$O$_4$, prelithiated Ni$_3$O$_4$, or a combination thereof, wherein x=1 to 2.

2. The anode active material layer of claim 1, wherein said high-elasticity polymer comprises an electron-conducting polymer selected from polyaniline, polypyrrole, polythiophene, polyfuran, a bi-cyclic polymer, a sulfonated derivative thereof, or a combination thereof.

3. The anode active material layer of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, ZnCo$_2$O$_4$; (f) prelithiated versions thereof; (g) particles of Li, Li alloy, or surface-stabilized Li having at least 60% by weight of lithium element therein; and (h) combinations thereof.

4. An anode active material layer for a lithium battery, said anode active material layer comprising multiple anode active material particles and a-conductive additive that are bonded together by a binder comprising a high-elasticity polymer having a recoverable tensile strain from 5% to 700% when measured without an additive or reinforcement in said polymer wherein said high-elasticity polymer contains a cross-linked network of polymer chains wherein said high-elasticity polymer comprises a polymer selected from natural polyisoprene, synthetic polyisoprene, polybutadiene, chloroprene rubber, polychloroprene, nitrile rubber. ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof; wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) prelithiated versions thereof; (g) particles of Li, Li alloy, or surface-stabilized Li having at least 60% by weight of lithium element therein; and (h) combinations thereof;

wherein said Li alloy contains from 0.1% to 10% by weight of a metal element selected from Zn, Ag, Au, Mg, Ni, Ti, Fe, Co, V, or a combination thereof.

5. The anode active material layer of claim 1, wherein said conductive additive is selected from a graphite, graphene, or carbon, or a combination thereof.

6. The anode active material layer of claim 5, wherein said graphite or carbon material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

7. The anode active material layer of claim 1, wherein anode active material particles are coated with or embraced by a conductive protective coating selected from a carbon material, graphene, electronically conductive polymer, conductive metal oxide, or conductive metal coating.

8. The anode active material layer of claim 1, wherein said high-elasticity polymer is a neat polymer having no additive or filler dispersed therein.

9. An anode active material layer for a lithium battery, said anode active material layer comprising multiple anode active material particles and a conductive additive that are bonded together by a binder comprising a high-elasticity polymer having a recoverable tensile strain from 5% to 700% when measured without an additive or reinforcement in said polymer wherein said high-elasticity polymer contains a cross-linked network of polymer chains wherein said high-elasticity polymer comprises a polymer selected from natural polyisoprene, synthetic polyisoprene, polybutadiene, chloroprene rubber, polychloroprene, nitrile rubber. ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof; wherein said high-elasticity polymer contains from 0.1% to 50% by weight of a lithium ion-conducting additive dispersed therein or contains therein from 0.1% by weight to 10% by weight of a reinforcement nano filament selected from carbon nanotube, carbon nano-fiber, graphene, or a combination thereof.

10. The anode active material layer of claim 9, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

11. The anode active material layer of claim 9, wherein said lithium ion-conducting additive is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

12. A lithium battery containing an optional anode current collector, the anode active material layer as defined in claim 1, a cathode active material layer, an optional cathode current collector, an electrolyte in ionic contact with said anode active material layer and said cathode active material layer, and an optional porous separator.

13. An anode active material layer for a lithium battery, said anode active material layer comprising multiple anode active material particles and a-conductive additive that are bonded together by a binder comprising a high-elasticity polymer having a recoverable tensile strain from 5% to 700% when measured without an additive or reinforcement in said polymer wherein said high-elasticity polymer contains a cross-linked network of polymer chains wherein said high-elasticity polymer comprises a polymer selected from natural polyisoprene, synthetic polyisoprene, polybutadiene, chloroprene rubber, polychloroprene, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof; wherein the lithium battery is a lithium-ion battery, lithium metal battery, lithium-sulfur battery, lithium-selenium battery, or lithium-air battery.

* * * * *